US012672034B2

(12) United States Patent
Freda et al.

(10) Patent No.: US 12,672,034 B2
(45) Date of Patent: Jun. 30, 2026

(54) SUPPLEMENTARY UPLINK IN WIRELESS SYSTEMS

(71) Applicant: InterDigital Patent Holdings, Inc., Wilmington, DE (US)

(72) Inventors: Martino M. Freda, Laval (CA); Ghyslain Pelletier, Montreal (CA); Mouna Hajir, Montreal (CA); Yugeswar Deenoo, Chalfont, PA (US); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/736,839

(22) Filed: Jun. 7, 2024

(65) Prior Publication Data

US 2024/0323774 A1    Sep. 26, 2024

Related U.S. Application Data

(63) Continuation of application No. 17/897,468, filed on Aug. 29, 2022, now Pat. No. 12,047,819, which is a
(Continued)

(51) Int. Cl.
*H04W 36/06*       (2009.01)
*H04W 36/00*       (2009.01)
(Continued)

(52) U.S. Cl.
CPC ....... *H04W 36/0061* (2013.01); *H04W 36/06* (2013.01); *H04W 36/08* (2013.01);
(Continued)

(58) Field of Classification Search
CPC . H04W 36/24; H04W 36/0061; H04W 36/06; H04W 36/08; H04W 36/30;
(Continued)

(56) References Cited

U.S. PATENT DOCUMENTS 8,913,530 B2    12/2014  Dimou et al.
9,743,433 B2    8/2017   Zhang et al.
(Continued)

FOREIGN PATENT DOCUMENTS

CN       103460740 A     12/2013
CN       104412686 A     3/2015
(Continued)

OTHER PUBLICATIONS

Third Generation Partnership Project (3GPP), "Discussion on RRM Impact on Uplink Sharing", Huawei, HiSilicon, 3GPP TSG-RAN WG4 Meeting #84bis, Dubrovnik, Croatia, Oct. 9-13, 2017, R4-1711227, 6 pages.
(Continued)

*Primary Examiner* — Khawar Iqbal
(74) *Attorney, Agent, or Firm* — Flaster Greenberg, P.C.

(57)              ABSTRACT

Supplementary uplink (SUL) may be used in wireless systems. Cell suitability criteria may be provided for cells configured with SUL. A Wireless Transmit/Receive Unit (WTRU) may receive paging with an indication of a carrier (e.g., SUL or regular uplink (RUL) in which to initiate part or all of an initial access. A WTRU that may be performing response-driven paging may provide (e.g. explicit) beam information for beamforming of a paging message on a non-beamformed SUL. A handover (HO) procedure (e.g., carrier selection, configuration handling, HO failure, etc.) may be provided for a WTRU with a configured SUL. A WTRU may request a change of a configured UL. A WTRU may (e.g., autonomously) perform a switch to a different (e.g., configured) uplink, for example, when one or more conditions may be met (e.g., conditional switch). Semi-persistent scheduling (SPS) resources/configuration may be relocated from a first UL to a second UL.

20 Claims, 7 Drawing Sheets

Related U.S. Application Data continuation of application No. 16/764,155, filed as application No. PCT/US2018/060947 on Nov. 14, 2018, now Pat. No. 11,463,923.

(60) Provisional application No. 62/629,901, filed on Feb. 13, 2018, provisional application No. 62/615,255, filed on Jan. 9, 2018, provisional application No. 62/585,878, filed on Nov. 14, 2017.

(51) Int. Cl.
| | |
|---|---|
| *H04W 36/08* | (2009.01) |
| *H04W 36/24* | (2009.01) |
| *H04W 36/30* | (2009.01) |

(52) U.S. Cl.
CPC ....... *H04W 36/085* (2023.05); *H04W 36/249* (2023.05); *H04W 36/30* (2013.01); *H04W 36/304* (2023.05)

(58) Field of Classification Search
CPC . H04W 36/36; H04W 72/0433; H04W 76/22; H04W 64/003; H04W 52/0206; H04W 88/06; H04W 52/0209; H04W 48/16; H04L 5/0032; Y02D 30/70
See application file for complete search history.

(56) References Cited

U.S. PATENT DOCUMENTS

| | | | |
|---|---|---|---|
| 9,882,684 B2 | 1/2018 | Gauvreau et al. | |
| 10,887,813 B2 | 1/2021 | Wang et al. | |
| 11,310,813 B2 | 4/2022 | Chang et al. | |
| 11,330,634 B2 | 5/2022 | Liu et al. | |
| 11,463,923 B2 | 10/2022 | Freda et al. | |
| 2010/0111023 A1 | 5/2010 | Pelletier et al. | |
| 2014/0161002 A1 | 6/2014 | Gauvreau et al. | |
| 2016/0183309 A1 | 6/2016 | Zhang et al. | |
| 2017/0118701 A1 | 4/2017 | Kim et al. | |
| 2019/0141773 A1 | 5/2019 | Kim et al. | |
| 2019/0150052 A1* | 5/2019 | Wang | H04W 36/08 370/331 |
| 2019/0261234 A1* | 8/2019 | Park | H04W 36/085 |
| 2020/0229180 A1* | 7/2020 | Liu | H04L 5/0092 |
| 2020/0260398 A1* | 8/2020 | Jiang | H04W 72/535 |
| 2020/0280913 A1* | 9/2020 | Chen | H04W 48/12 |
| 2020/0288358 A1* | 9/2020 | Hu | H04W 48/16 |
| 2020/0305186 A1 | 9/2020 | Alfarhan et al. | |
| 2020/0305200 A1* | 9/2020 | Jiang | H04W 74/0833 |
| 2021/0112592 A1* | 4/2021 | Lee | H04W 16/14 |
| 2021/0259037 A1* | 8/2021 | Kim | H04W 76/19 |
| 2021/0385836 A1* | 12/2021 | Ye | H04W 16/14 |
| 2022/0104272 A1 | 3/2022 | Liang | |
| 2022/0150969 A1* | 5/2022 | Babaei | H04L 1/1812 |
| 2022/0232637 A1* | 7/2022 | Jiang | H04W 74/0833 |
| 2022/0240136 A1* | 7/2022 | Park | H04W 36/00837 |
| 2023/0328597 A1* | 10/2023 | Xiong | H04L 5/0051 370/331 |

FOREIGN PATENT DOCUMENTS

| | | |
|---|---|---|
| CN | 104469923 A | 3/2015 |
| JP | 2020-535715 A | 12/2020 |
| WO | WO 2012/095180 A1 | 7/2012 |
| WO | 2019/065618 A1 | 4/2019 |

OTHER PUBLICATIONS

Third Generation Partnership Project (3GPP), "Summary of Remaining Details on RACH Procedure", Qualcomm, 3GPP TSG RAN WG1 Meeting 90bis, Prague, CZ, Oct. 9-13, 2017, R1-1719197, 29 pages.

3rd Generation Partnership Project (3GPP), "Discussion on SUL carrier", ZTE, Sanechips, R2-1711841, 3GPP TSG RAN WG1, Meeting # 99bis, Prague, Czech, Oct. 9-13, 2017, 6 Pages.

3rd Generation Partnership Project (3GPP), TS 36.331 V14.2.0, "Technical Specification Group Radio Access Network, Evolved Universal Terrestrial Radio Access (E-UTRA), Radio Resource Control (RRC), Protocol Specification (Release 14)", Mar. 2017, pp. 1-717.

3rd Generation Partnership Project (3GPP), R2-1711808, "Connected Mode Aspects of Supplementary Uplink Frequency", Samsung, 3GPP TSG-RAN WG2 #99bis, Prague, Czech Republic, Oct. 9-13, 2017, pp. 1-4.

3rd Generation Partnership Project (3GPP), R2-1711824, "Considerations on Support of Supplementary Uplink Frequency", CMCC, 3GPP TSG-RAN WG2 Meeting #99bis, Prague, Czech Republic, Oct. 9-13, 2017, 6 pages.

3rd Generation Partnership Project (3GPP), TS 36.213 V13.2.0, "Technical Specification Group Radio Access Network, Evolved Universal Terrestrial Radio Access (E-UTRA), Physical Layer Procedures (Release 13)", Jun. 2016, pp. 1-381.

3rd Generation Partnership Project (3GPP), TS 36.300 V13.3.0, "Technical Specification Group Radio Access Network, Evolved Universal Terrestrial Radio Access (E-UTRA) and Evolved Universal Terrestrial Radio Access Network (E-Utran), Overall Description, Stage 2 (Release 13)", Mar. 2016, pp. 1-295.

3rd Generation Partnership Project (3GPP), TS 36.321 V13.1.0, "Technical Specification Group Radio Access Network, Evolved Universal Terrestrial Radio Access (E-UTRA), Medium Access Control (MAC) Protocol Specification (Release 13)", Mar. 2016, pp. 1-85.

3rd Generation Partnership Project (3GPP), TS 36.331 V13.1.0, "Technical Specification Group Radio Access Network, Evolved Universal Terrestrial Radio Access (E-UTRA), Radio Resource Control (RRC), Protocol Specification (Release 13)", Mar. 2016, pp. 1-551.

3rd Generation Partnership Project, "Technical Specification Group Radio Access Network; NR; NR and NG-RAN Overall Description; Stage 2 (Release 15)", 3GPP TS 38.300 V1.1.0, Oct. 2017, 59 pages.

3rd Generation Partnership Project, "WF on initial access with SUL", Huawei, HiSilicon, MediaTek et al., R1-1715152, 3GPP TSG RAN WG1 meeting #90, Prague, Czech Republic, Aug. 21-25, 2017, 3 pages.

3rd Generation Partnership Project, "Discussion on the PRACH for SUL", Huawei, HiSilicon, R1-1715716, 3GPP TSG RAN WG1 Meeting NR#3, Nagoya, Japan, Sep. 18-21, 2017, 5 pages.

3rd Generation Partnership Project, "Remaining issues on the PRACH for SUL", Huawei, HiSilicon, R1-1717901, 3GPP TSG RAN WG1 Meeting 90bis, Prague, Czech Republic, Oct. 9 -13, 2017, 5 pages.

* cited by examiner

SUPPLEMENTARY UPLINK IN WIRELESS SYSTEMS

CROSS-REFERENCE TO RELATED APPLICATIONS

This application is a continuation of Non-Provisional U.S. patent application Ser. No. 17/897,468, filed Aug. 29, 2022, which is a continuation of Non-Provisional U.S. patent application Ser. No. 16/764,155, filed May 14, 2020, which issued as U.S. Pat. No. 11,463,923 on Oct. 4, 2022, which is the U.S. National Stage, under 35 U.S.C. § 371, of International Application No. PCT/US2018/060947, filed Nov. 14, 2018, which claims the benefit of Provisional U.S. Patent Application No. 62/629,901, filed Feb. 13, 2018, 62/615,255, filed Jan. 9, 2018, and 62/585,878, filed Nov. 14, 2017, the disclosures of which are incorporated herein by reference in their entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are disclosed for supplementary uplink (SUL) in wireless systems. Cell suitability criteria may be provided for cells configured with SUL. A WTRU may receive paging with an indication of a carrier (e.g. SUL or regular uplink (RUL)) in which to initiate part or all of an initial access. A Wireless Transmit/Receive Unit (WTRU) that may be performing response-driven paging may provide (e.g. explicit) beam information for beamforming of a paging message on a non-beamformed SUL. A handover (HO) procedure (e.g. carrier selection, configuration handling, HO failure) may be provided for a WTRU with a configured SUL. A WTRU may request a change of a configured UL. A WTRU may (e.g. autonomously) perform a switch to a different (e.g. configured) uplink, e.g., when one or more conditions may be met (e.g. conditional switch). Semi-persistent scheduling (SPS) resources/configuration may be relocated from a first UL to a second UL. Duplication and UL path selection may be provided for radio resource control (RRC) messages in the presence of an SUL. A WTRU may or may not trigger radio link failure (RLF), for example, based on whether RLF related conditions occurred on SUL/RUL and based on SUL/RUL configuration. Conditions may be set for suspension/reset of RLF related counters/timers upon a switch between RUL/SUL. A WTRU may inform a master node (MN) of an RUL/SUL configuration, for example, during secondary cell group (SCG) failure information reporting. A procedure (e.g. with corresponding WTRU behavior) may be implemented for partial SCG failure that may be triggered by SCG RLF on an RUL. A WTRU may select a UL carrier (e.g. SUL/RUL) on which to initiate re-establishment. Procedures may be provided for UL selection of a system information (SI) request in the presence of an SUL/RUL.

A WTRU may receive a handover (HO) command, and select an uplink (UL) carrier for HO based on the HO command. For example, if the HO command comprises an explicit indication of one UL carrier for HO, then the WTRU may select the UL carrier for HO based on whether random-access channel (RACH) resources are provided for a supplementary uplink (SUL) or a regular uplink (RUL) in the HO command. If the HO command comprises a configuration for both a SUL and a RUL in the HO command, then the WTRU may select the UL carrier for HO based on whether a downlink reference signal received power (DL-RSRP) of the SUL is below a threshold. For example, if the DL-RSRP of the SUL is below the threshold, then the SUL is selected as the UL carrier for HO, and if the DL-RSRP of the SUL is equal to or above the threshold, then the RUL is selected as the UL carrier for HO.

A wireless transmit/receive unit (WTRU), may use different cell suitability criteria based on whether the cell is configured with a SUL that the WTRU supports. For example, the WTRU may determine suitability of a cell. If the cell is configured with a SUL and the WTRU supports SUL communication for the frequency (e.g., SUL frequency) of the cell, then the WTRU may determine the suitability of the cell using first cell suitability criteria. If the cell is not configured with a SUL or the WTRU does not support SUL communication for the frequency of the cell, then the WTRU may determine suitability of the cell using second cell suitability criteria. Thereafter, the WTRU may select the cell based on the determined suitability of the cell, and camp on the selected cell.

The first cell suitability criteria may include (e.g., utilize) a SUL offset specific to the cell. The second cell suitability criteria may include (e.g., utilize) a non-SUL offset specific to the cell that is different from the SUL offset. The WTRU may receive the SUL offset and/or the non-SUL offset from the network. The WTRU may receive system information from the cell, determine that the system information includes SUL configuration information, and determine that the cell is configured (e.g., or is not configured) with the SUL based on the reception of the SUL configuration information.

The WTRU may receive, from the cell, a system information block (SIB) comprising information relating to a second cell, and determine suitability of the second cell based on the SIB. For example, if the second cell is configured with a SUL and the WTRU supports SUL communication, then the WTRU may determine suitability of the second cell using third cell suitability criteria (e.g., that includes an SUL-offset), whereas, if the second cell is not configured with a SUL or the WTRU does not support SUL communication, then the WTRU may determine suitability of the second cell using fourth cell suitability criteria (e.g., that includes a non-SUL-offset). The SIB may indicate whether the second cell supports SUL communication. The SIB may include an indication of a neighboring cell list with cell identifications (IDs) of cells supporting SUL, and/or an indication of the SUL frequency of the cell supporting SUL.

BRIEF DESCRIPTION OF THE DRAWINGS

Like reference numerals in the figures indicate like elements.

Figure 1A:
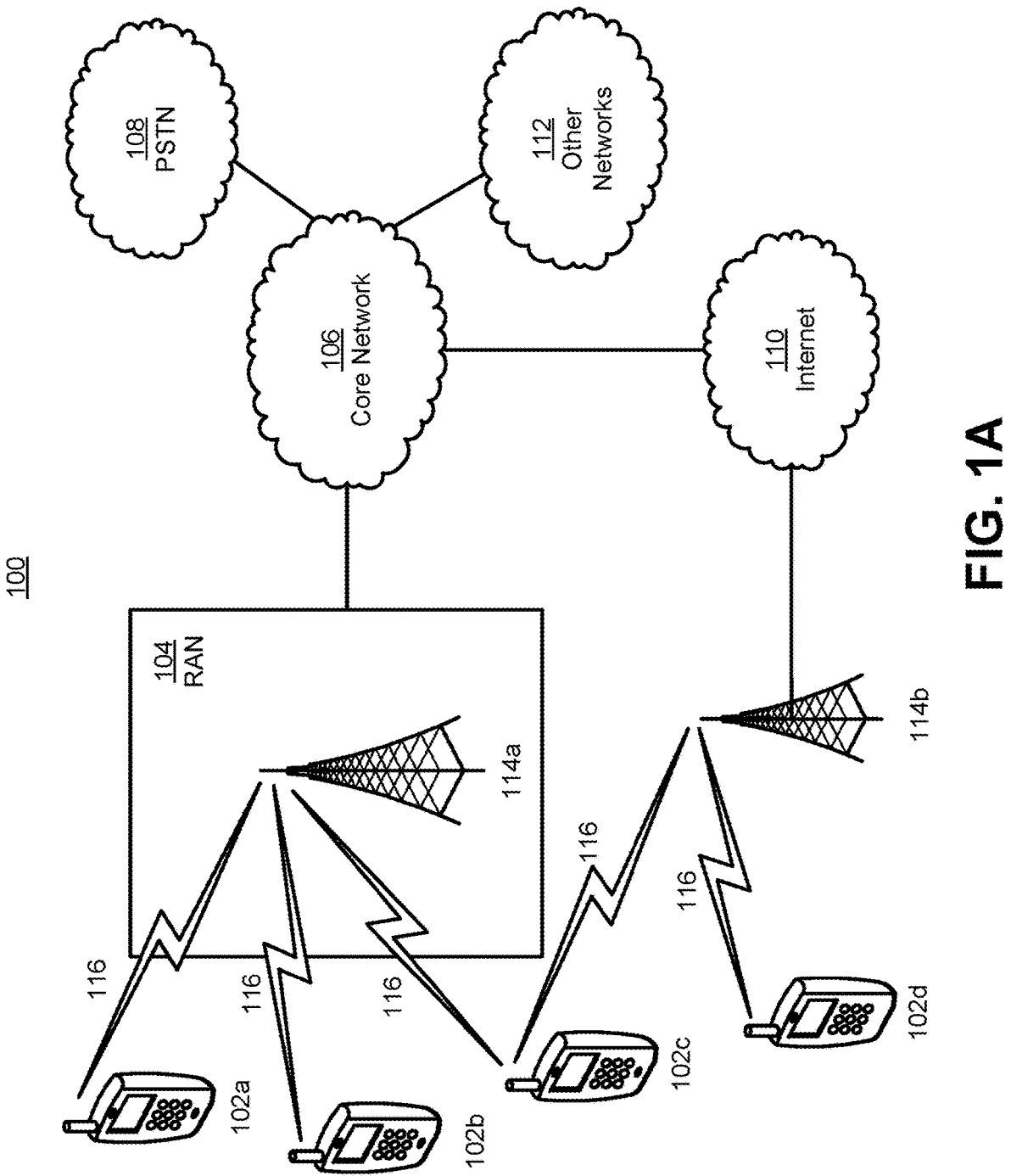
FIG. 1A is a system diagram illustrating an example communications system in which one or more disclosed embodiments may be implemented.

that may be used within the communications system illustrated in FIG. 1A according to an embodiment.

Figure 1B:
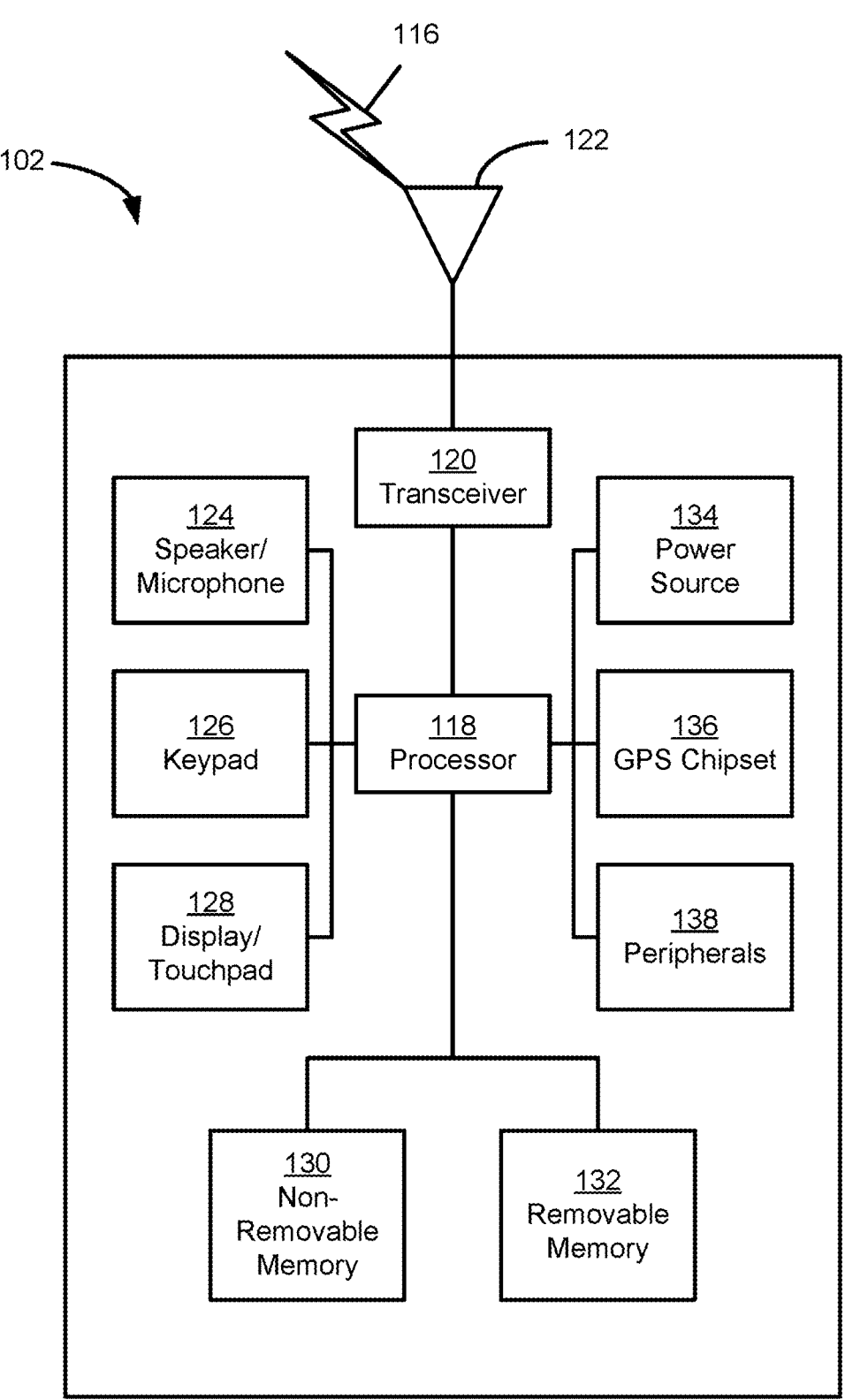
FIG. 1B is a system diagram illustrating an example wireless transmit/receive unit (WTRU) that may be used within the communications system illustrated in FIG. 1A according to an embodiment.
Figure 1C:
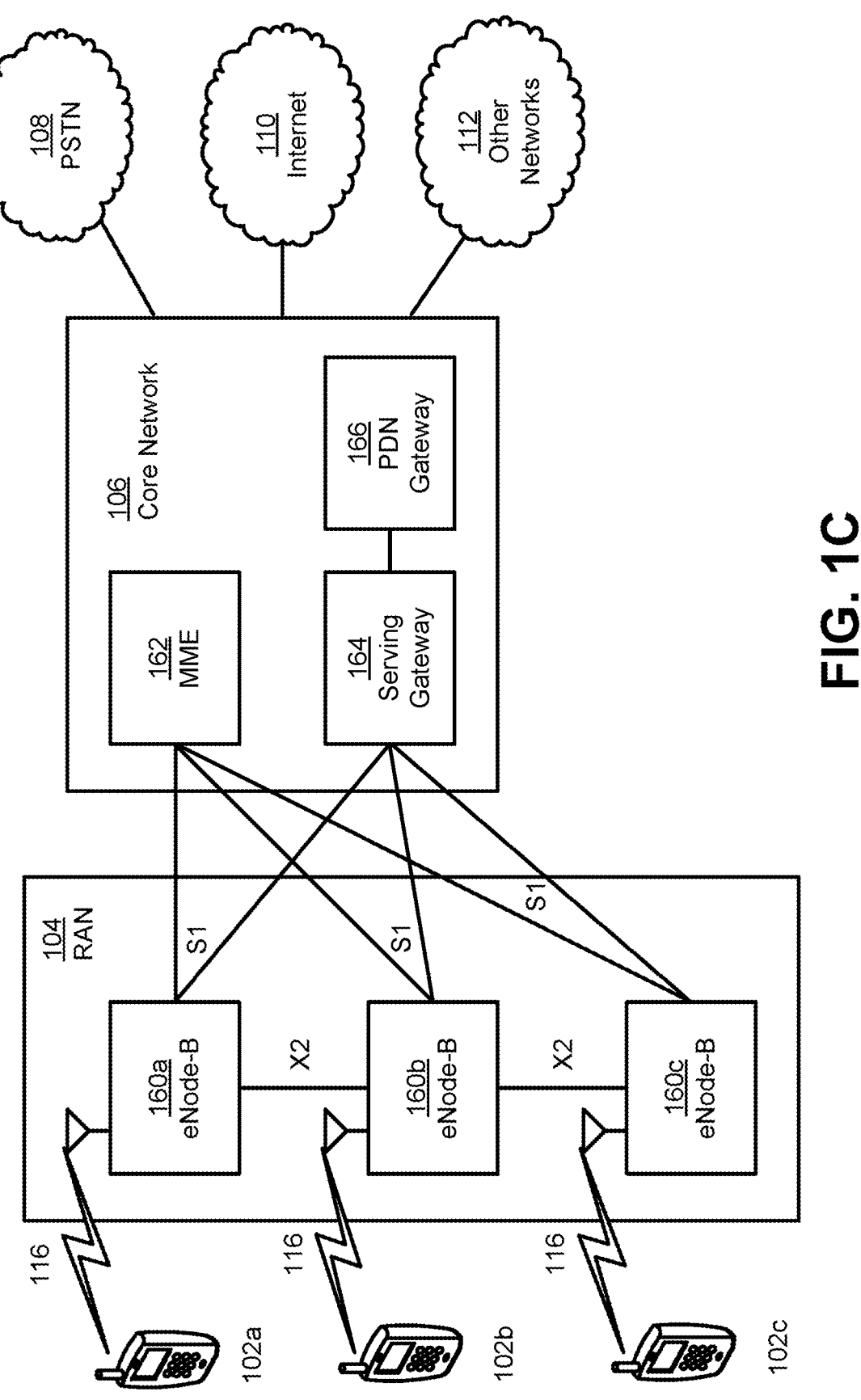
FIG. 1C is a system diagram illustrating an example radio access network (RAN) and an example core network (CN)
Figure 1D:
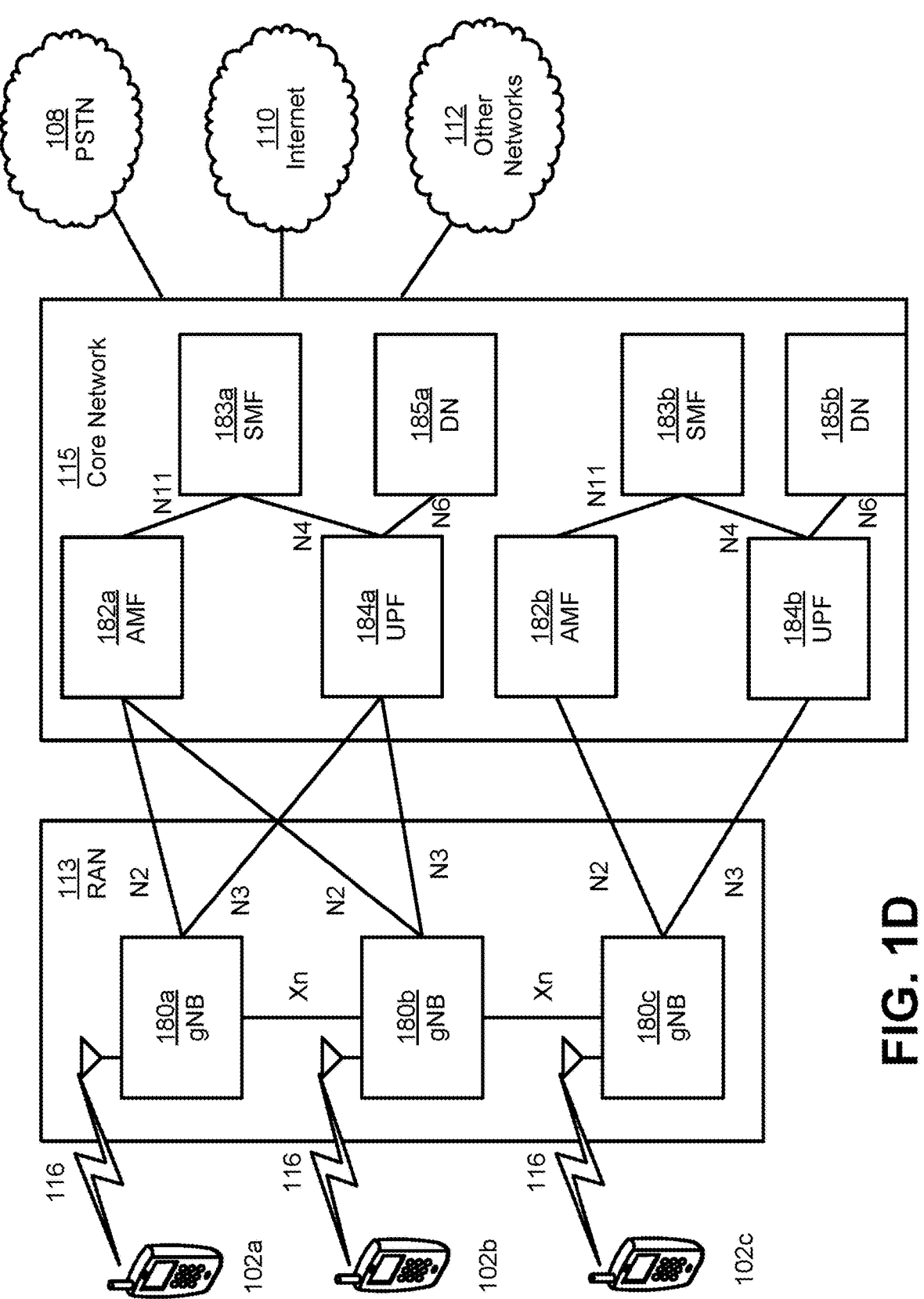

FIG. 1D is a system diagram illustrating a further example RAN and a further example CN that may be used within the communications system illustrated in FIG. 1A according to an embodiment.

Figure 2:
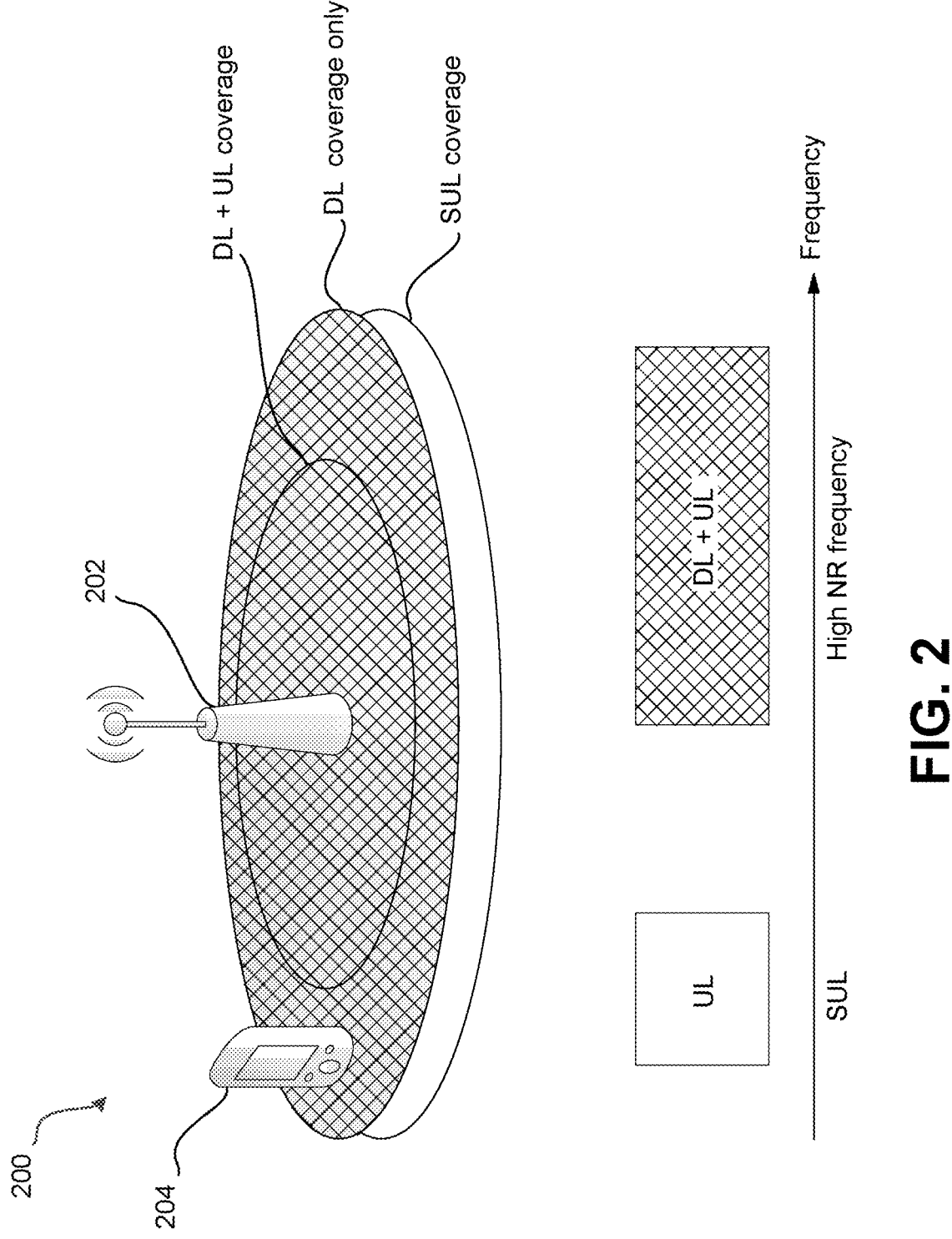

FIG. 2 is a diagram of an example coverage map of a cell (e.g., a gNB).

Figure 3:
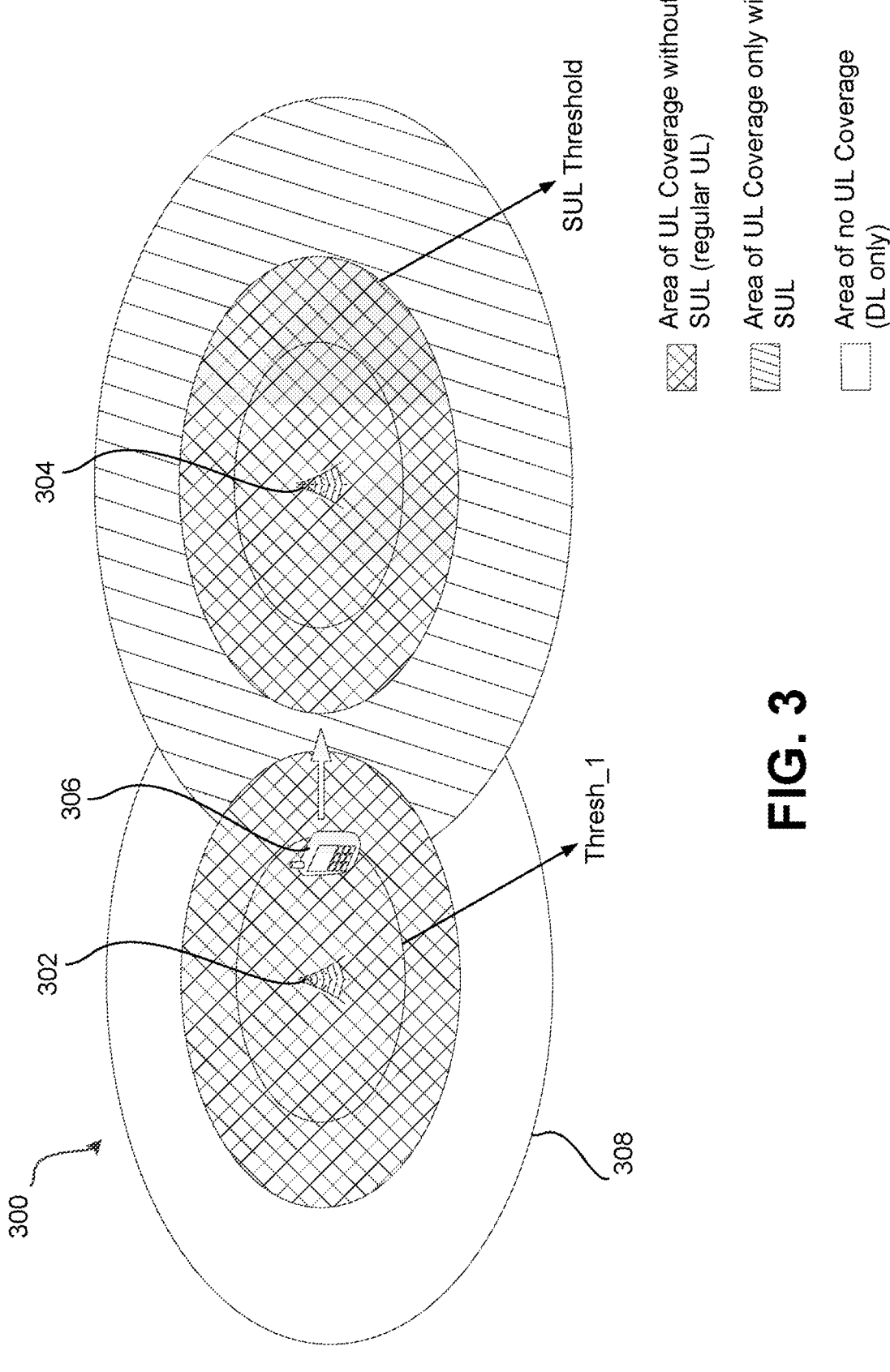

FIG. 3 is a diagram of an example coverage map illustrating two cells.

Figure 4:
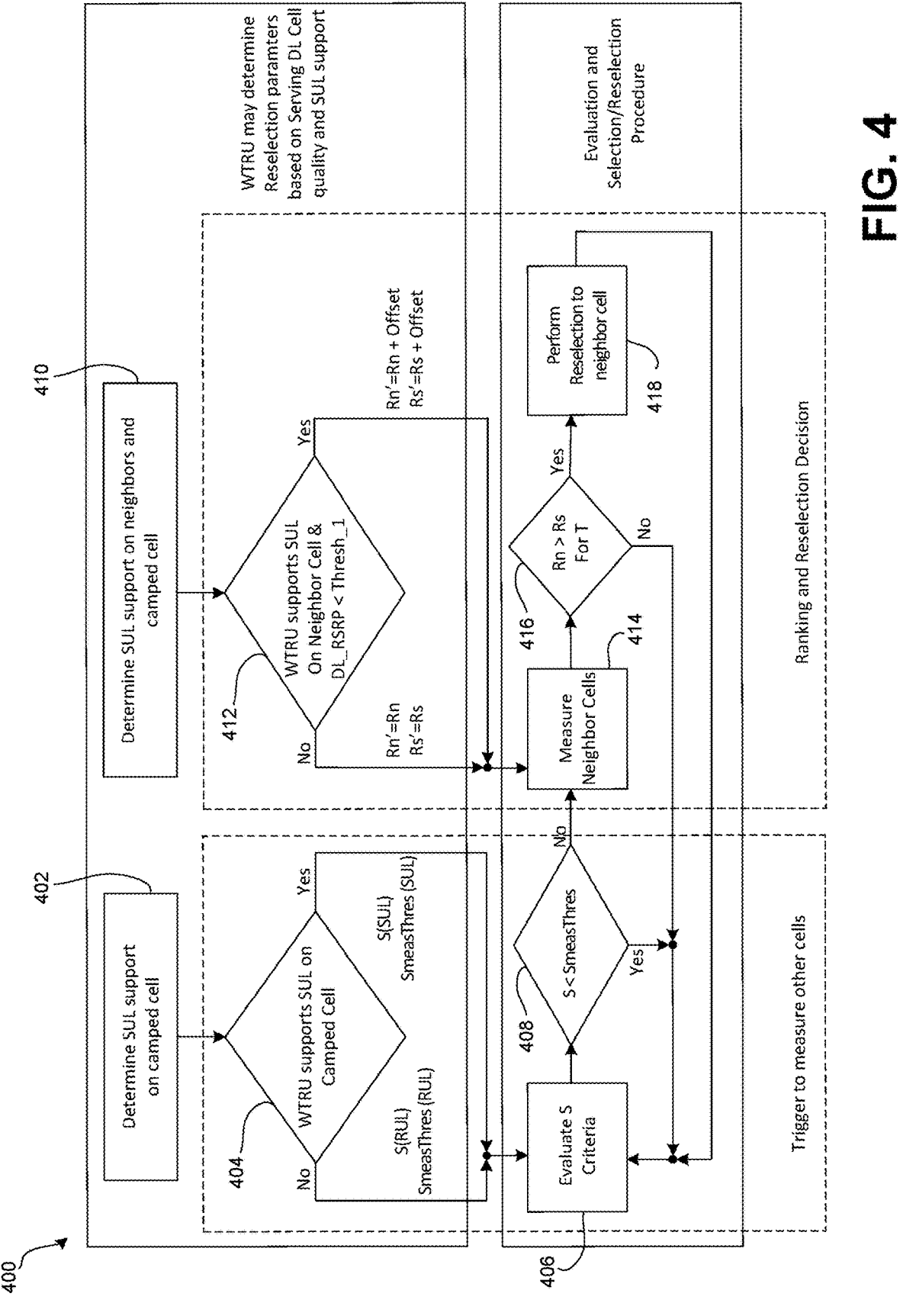

FIG. 4 is a flowchart of an example cell selection/reselection procedure that may be performed by a WTRU.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g. radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR)

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g. a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g. WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g. the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g. the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g. multiple antennas) for transmitting and receiving wireless signals over the air interface 116

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g. a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g. longitude and latitude) regarding the current location of the WTRU 102. In addition to, or in lieu of, the information from the GPS chipset 136, the WTRU 102 may receive location information over the air interface 116 from a base station (e.g. base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor The WTRU 102 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit 139 to reduce and or substantially eliminate self-interference via either hardware (e.g. a choke) or signal processing via a processor (e.g. a separate processor (not shown) or via processor 118). In an embodiment, the WRTU 102 may include a half-duplex radio for which transmission and reception of some or all of the signals (e.g. associated with particular subframes for either the UL (e.g. for transmission) or the downlink (e.g. for reception))

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g. an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers Although the WTRU is described in FIGS. 1A-1D as a wireless terminal, it is contemplated that in certain representative embodiments that such a terminal may use (e.g. temporarily or permanently) wired communication interfaces with the communication network.

In representative embodiments, the other network 112 may be a WLAN

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS High Throughput (HT) STAs may use a 40 MHz wide channel for communication, for example, via a combination of the primary 20 MHz channel with an adjacent or nonadjacent 20 MHz channel to form a 40 MHz wide channel Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC)

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life)

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHZ, 4 MHz, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g. containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g. such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g. handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g. an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Examples provided herein do not limit applicability of the subject matter to other wireless technologies, e.g., using the same or different principles as may be applicable.

The term network may refer to one or more gNBs that may (e.g. in turn) be associated with one or more Transmission/Reception Points (TRPs) or other node in a radio access network (RAN).

A cell may be configured (e.g. in NR) with a supplementary uplink (SUL). An SUL may extend the coverage of a WTRU that may be operating in high frequency, for example, by switching the UL to a lower band, e.g., when the WTRU may be far from a gNB. An SUL may be modeled (e.g. in NR) as a cell with a DL carrier that may be associated with multiple (e.g. two) separate UL carriers. For example, the DL carrier may be associated with a regular UL (RUL) (e.g., which may be in a high frequency band where a DL carrier may be located) and an SUL (e.g., which may be in a frequency band that is lower than the frequency band of the RUL).

An SUL may be configured for a PCell (e.g. in an NR standalone mode) and a PSCell (e.g. in NR-NR DC or in dual connectivity between LTE and NR, which may be termed NSA mode or EN-DC).

A WTRU may perform initial access to a cell, for example, using RUL or SUL. An SUL configuration may be broadcast in minimum SI by a cell. A WTRU may select an SUL for initial access, for example, when (e.g. only when) a DL quality of a serving cell may be below a threshold.

Multiple (e.g. three) operating modes may be possible for SUL when a WTRU is in RRC Connected. An RRC may (e.g. in a first operating mode) configure a WTRU with multiple (e.g. two) ULs, for example, a full UL configuration and a sounding reference signal (SRS) configuration. A WTRU may (e.g. in this mode of operation) use a fully configured UL configuration (e.g. for all control and data transmission in the uplink), but may transmit SRS on another (e.g. non-fully configured) uplink. RRC reconfiguration (e.g. to provide a full UL configuration for a different carrier) may be used, for example, to switch between UL data between different ULs. An RRC may (e.g. in a second operating mode) configure multiple ULs (e.g. fully configured ULs), for example two fully configured ULs. Signaling, such as MAC CE or DCI, may be defined to enable a WTRU to switch between UL configurations. An RRC may (e.g. in a third operating mode) configure multiple (e.g. two) ULs, which may (e.g. both) be used, for example, when a PUSCH transmission for a single serving cell may not occur simultaneously for multiple ULs.

SUL may be supported in RRC. In carrier aggregation, an UL carrier (e.g. each UL carrier) may be associated with and scheduled by a (e.g. single) DL carrier in the same band.

A UL carrier that may be used in RRC Procedures may be associated with an (e.g. each) RRC state. Rules may be associated with initial access to a cell having SUL. Selection of a UL carrier for an (e.g. each) RRC procedure may, for example, depend on factors beyond or different than DL quality.

An SUL may be in a frequency band that may be different than a DL carrier. A UL carrier of a cell (e.g. in LTE) may be in the same frequency as a DL carrier. For example, when performing response driven paging, a paging indicator response performed on SUL may not be used by a network (NW) to select a DL beam to transmit paging record.

A WTRU may have a different coverage depending on use of RUL or SUL. One or more procedures (e.g., RLF, SCG failure, re-establishment, etc.) may take into consideration a UL carrier that is being used for the one or more procedures, e.g., to be consistent with their intended purpose.

One or more procedures may limit use of an SUL by WTRUs. It may be preferable to reduce the number of carriers to configure as SUL (e.g. given that they may also be normal UL carriers for cells at low frequency), for example, even when (e.g. all) DL carriers in the high frequency band may be configured with an SUL.

A WTRU may be configured to perform cell selection and/or reselection based one or more criterions in NR systems with SUL. For cell selection and/or cell-reselection, the existing criterion in E-UTRAN may be calculated taking into account the DL RSRP and RSRQ with offset compensation for higher priority cells. A WTRU's transmission power may be taken into account with the parameter Pcompensation. A cell selection criterion S in normal coverage may be fulfilled in E-UTRAN when: where:

$$Srxlev > 0 \text{ AND } Squal > 0$$

$$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

$$Pcompensation = \max(P_{EMAX1} - P_{PowerClass}, 0)(\text{dB})$$

A WTRU's Tx power (PPowerClass) lower than the value allowed in the cell (PEMAX1) may result in a greater PCompensation value (e.g., making it hard to select the cell). A certain correspondence between UL and DL transmission may be assumed in LTE bands. In mmWaves, however, the UL transmission may be impacted (e.g., strongly impacted) by the propagation environment. In such scenarios, the foregoing equation may not be sufficient for cell-selection and/or reselection.

FIG. 2 is a diagram of an example coverage map 200 of a cell 202 (e.g., a gNB). In high frequencies (e.g., high new radio (NR) frequencies), UL coverage of the cell 202 may be significantly less than DL coverage of the cell 202. The cell 202 may include a Supplementary UL (SUL), which for example, may be a lower frequency than the regular UL (RUL) and the downlink (DL) of the cell 202. The RUL and SUL may be paired with each DL of a cell (e.g., an SCell). A WTRU 204 may camp on the SUL when RSRP<SUL_threshold (e.g., when RSRP of the RUL is <SUL_threshold). The network may deploy the SUL unevenly in an area (e.g., some cells may include SULs, while other cells may not). Support of SUL by the WTRU 204 may be defined per band combination (e.g., per frequency). The WTRU 204 may not support SUL configured for a specific cell (e.g., the WTRU 204 may not support SUL for the frequency of the SUL of the cell). If the WTRU 204 uses only DL measurements, the WTRU 204 may camp in a cell with poor uplink coverage, leading to unnecessary handovers or re-establishments upon connection. The examples provided herein may, for example, be used to ensure that a WTRU camps on a cell having the best combination of downlink and uplink coverage in an environment with mixed SUL/non-SUL support.

FIG. 3 is a diagram of an example coverage map 300 illustrating two cells 302, 304. The cell 302 may not support SUL, while the cell 304 may support SUL (e.g., as illustrated by the area of no UL coverage 308). The WTRU 306 may be located proximate to the boundary between the cell 302 and the SUL coverage area of cell 304. Thresh_1 may indicate a threshold (e.g., cell quality threshold, such as RSRP) that the WTRU 306 uses when determining whether to stay camped within cell 302 or reselect to the SUL of cell 304. SUL Threshold may indicate a threshold (e.g., cell quality threshold, such as RSRP) that the WTRU 306 uses when determining whether to communicate with the cell 304 on the RUL or switch to communicating via the SUL of cell 304.

FIG. 4 is a flowchart of an example cell selection/reselection procedure 400 that may be performed by a WTRU. A WTRU that supports SUL may use modified cell selection and/or cell reselection procedures to prioritize cell(s) that utilize SUL in band combinations supported by the WTRU over a cell that does not support SUL. For example, for cells that utilize SUL in a band combination supported by the WTRU, the WTRU may receive biasing/offset information for one or more of the S-criteria evaluation (e.g., a suitability offset for SUL cells), neighbor cell measurement triggering threshold(s) (e.g., SmeasThres), neighbor cell reselection ranking criteria (e.g., Rn), and/or serving cell reselection ranking criteria (Rs). The biasing/offset information may be provided in system information. The biasing/offset information may be used (e.g., only used) by WTRUs that support SUL in the band combination (e.g., transparent to network for IDLE mode WTRUs). The biasing/offset information may be used to favor SUL cells during cell selection and reselection.

For example, in 402, 404, 410, and 412, the WTRU may determine selection or reselection parameters based on Serving DL Cell quality (e.g., RSRP) and/or SUL support (e.g., on the SUL frequency) of the WTRU. In 406, 408, 414, 416, and 418, the WTRU may perform an evaluation and/or selection/reselection procedure, for example, using values determined during 402, 404, 410, and/or 412. In 404-408, the WTRU may be determining whether to measure other cells and trigger ranking and reselection. In 412-418, the WTRU may be performing cell ranking and reselection decisions. In 414-416, the neighbor cells to consider for reselection may be further dependent on the same condition as 406-408.

The WTRU may determine whether one or more cells (e.g., camped cell, camping target, neighbor cells, etc.) utilize a SUL. For instance, at 402, the WTRU may determine whether a camped cell supports SUL, while at 410, the WTRU may determine whether one or more neighbor and/or potential reselection cells support SUL. The WTRU may determine whether the WTRU supports the SUL (e.g., the band combination) on the camped cell at 404 (e.g., based on system information and WTRU capabilities). If so, the WTRU may use SUL specific values for S and SmeasThres (e.g., S(SUL), SmeasThres (SUL)), for example, when performing a reselection analysis. If not, the WTRU may use RUL specific values for S and SmeasThres (e.g., S(RUL), SmeasThres (RUL)), for example, when performing a reselection analysis.

Similarly, when determining SUL support on neighbors and target cells at 410, the WTRU may determine whether the WTRU supports SUL on a Neighbor Cell and/or whether the DL_RSRP<Thresh_1. If the WTRU supports SUL on the cell and if DL_RSRP<Thresh_1, then the WTRU may use an offset value (e.g., Rn'=Rn+Offset and Rs'=Rs+Offset), for example, when performing an evaluation and/or selection/reselection analysis. If the WTRU does support SUL on the cell and/or if DL_RSRP>Thresh_1, then the WTRU may use Rn'=Rn and Rs'=Rs, for example, when performing an evaluation and/or selection/reselection analysis. As noted above, in 406, 408, 414, 416, and 418, the WTRU may perform an evaluation and/or selection/reselection procedure, for example, using values determined during 402, 404, 410, and/or 412.

Examples of idle/inactive state procedures for the use of SUL are provided herein. For example, cell suitability criteria may take into account the presence of SUL/RUL configuration. Cell suitability criteria may apply to one or more (e.g. all) procedures that may utilize cell suitability (e.g. camping). Cell suitability criteria may depend on whether a cell may be configured with a SUL, and may utilize one or more of a threshold, an offset, or a criterion (e.g. Squal or similar) for cell quality of a suitable cell. For example, the threshold, the offset, and/or the criterion for an SUL may be different than those of a RUL. A WTRU may receive an offset or compensation parameter, which may be used to determine cell suitability criteria, for example, depending whether the cell may be configured with SUL and/or depending whether the WTRU supports the SUL feature. Alternatively or additionally, a WTRU may utilize multiple (e.g. two) different cell suitability criteria calculations. For example, a WTRU may select a first calculation to determine suitability for a cell that transmits SUL configuration information in system information. The WTRU may select a second suitability criteria calculation when determining suitability criteria for a cell that does not transmit an SUL configuration in system information, or, for example, when the WTRU may not support the SUL feature.

Cell selection in idle may be implemented considering SUL/RUL. In an example, a WTRU may consider the quality of the UL transmission in a cell in its cell selection criterions. For example, a WTRU may differentiate the cells configured with SUL for a suitability evaluation. The WTRU may determine the suitability evaluation based on one or more of the following. For example, such differentiation/evaluation may: be dependent on the frequency carrier of the RUL and paired DL; take into account the configuration of SUL (e.g., if applicable); be captured in the UL Pcompensation used in the evaluation of the cell selection criterion; be evaluated through a new cell selection criterion that takes into account the propagation characteristic of the cell (e.g., as well as the configuration of SUL if applicable); and/or may take into account the parameters for cell selection associated to prioritize or otherwise favor one of the two configurations (e.g., RUL versus SUL).

In an example, additional cell selection-reselection criterion may be introduced to evaluate the impact of the propagation for the WTRU uplink transmission and the necessity of selecting a cell with configured SUL (e.g., if applicable). For example, any combination of the following three conditions may be used to select a given cell:

$$Srxlev > 0, \text{ Squal} > 0, \text{ and/or } Stxlev > 0$$

where:

$Stxlev = Q_{rxlevmeas} - Q_{rxlevthreshold} + Q_{SUL\text{-}offset}$;

$Q_{rxlevmeas}$ is the measured cell RX level value (RSRP);

$Q_{rxlevthreshold}$ is the configured RSRP threshold received by the WTRU in RMSI; and $Q_{SUL\text{-}offset}$ is an offset to the signaled $Q_{rxlevthreshold}$ (e.g., $Q_{SUL\text{-}offset}$ may be used in the Stxlev evaluation to adjust its value when SUL and associated power compensation are configured in the cell); and When SUL is not configured, $Q_{SUL\text{-}offset} = 0$.

Additional cell selection-reselection criterion may be used when selecting a cell with configured SUL (e.g., if applicable). A Pcompensation value for a cell takes into account the configuration of SUL. In mmWaves, even if the maximum power of transmission of the WTRU equals the maximum allowed power in a cell, the UL coverage may not be sufficient for the WTRU to reach its serving transmission point. In the calculation of Pcompensation, a frequency offset $Q_{freq\text{-}offset}$ may be introduced to capture the propagation conditions in the UL of WTRUs in higher frequencies when SUL is configured and not.

$$Pcompensation = \max - (P_{EMAX1} - P_{PowerClass} + Q_{freq\text{-}offset}, 0)(dB)$$

where:

$P_{EMAX1}$ is the maximum TX power level a WTRU may use when transmitting on the uplink in the cell (dBm);

$P_{PowerClass}$ is the maximum RF output power of the WTRU (dBm) according to the WTRU power class; and $Q_{freq\text{-}offset}$ is the offset to the signaled $P_{PowerClass}$ taken into account in the Pcompensation evaluation as a result.

The value of $Q_{freq\text{-}offset}$ may be a function of the cell frequency carrier and the configuration (e.g., or lack of configuration) of the SUL. This is may (e.g., intentionally) make it harder for/less likely that the WTRU to select cells with a poor estimated UL coverage and no SUL configured, while cells with configured SUL will have a higher chance to be selected by the WTRU.

In an example, a cell selection criteria for a SUL may be based on the following:

$$Srxlev > 0, \text{ Squal} > 0, \text{ and/or } Stxlev > a$$

where:

Srxlev may evaluate the quality of the downlink transmission (e.g., the Pcomensation of the uplink is not included in the calculation). $Srxlev = Q_{rxlevmeas} - (Q_{rxlevmin} + Q_{rxlevminoffset}) - Qoffset_{temp}$ Stxlev may evaluate the quality of the uplink transmission (e.g., separately). $Stxlev = Pcompensation$ where $Pcompensation = \max ((P_{EMAX1} - P_{PowerClass}), (P_{EMAX1\_SUL} - P_{PowerClass\_SUL}))$. The $P_{Power\_Class}$ value may be different depending on whether the WTRU is operating in two different RF chains (such as, for example, one for frequencies above 6 GHz and the other below 6 GHz). The threshold a may be broadcasted in system information and/or may be configurable by the network.

The WTRU may receive an additional value of $P_{EMAX1}$. $P_{EMAX1\_SUL}$ may apply for the SUL carrier. $P_{EMAX1\_SUL}$ may be received in a SIB. $P_{EMAX1\_SUL}$ may be used in the Pcompensation calculation as the maximum TX power level a WTRU to use when transmitting on the SUL carrier.

A WTRU may consider one of more factors when performing cell reselection in IDLE. For example, a WTRU may consider the support of a SUL by a cell in its cell reselection rules. In an example, the WTRU may prioritize a cell having an SUL configuration (e.g., or providing access via an SUL over a cell without SUL) when deciding whether to camp on a cell and/or whether to measure intra/inter-frequency neighbor cells. Such decision may be dependent on one or more of the following, that such prioritization may, for example: be limited to certain types of WTRUs or a WTRU with certain capabilities (e.g., MTC WTRU vs normal WTRU); be limited to WTRUs in a certain state, such as the WTRU's current battery power, temporary capability restrictions, etc.; be dependent on the area in which the WTRU is currently roaming, or be dependent on the WTRU's PLMN; and/or be determined based on rules derived from information in SIBs broadcast by the cell(s), or in an RRCConnectionRelease or RRCConnectionReject message.

In an example, a WTRU may, when camped on an cell, be provided with different values of intra frequency search thresholds (e.g., S(intraSearchP), S(intraSerachQ), etc.) depending on whether the serving cell has an SUL or not. If a WTRU is camped on a cell with a SUL, the WTRU may use cell reselection parameters associated with SUL. If a WTRU is camped on a cell without SUL, the WTRU may use cell reselection parameters associated with a cell without SUL. Such difference may allow a WTRU to initiate intra-frequency measurements more quickly (e.g., to account for reduced UL coverage) when a cell does not support SUL. The cell reselection parameters may be area specific (e.g., and not cell specific). Therefore, the cell reselection parameters associated with a cell with SUL and the cell reselection parameters associated with a cell without SUL may be broadcast in system information.

A WTRU may apply an additional offset to the cell ranking criteria for determination of the best cell, for example, depending on whether the cell has an SUL or not.

The offset may be provided in system information. A WTRU may be provided with different values of Qoffset/Qoffset$_{Temp}$ for RUL and SUL cells, and apply such offset to the cell ranking for a cell (e.g., serving or neighbor) depending on whether such cell supports SUL or not.

The offset applied for cell-ranking may be applied to the cell ranking criteria depending on the measured cell RX level (RSRP) of the DL in the cell and/or the presence of an SUL configured for that cell. For example, the WTRU may apply an offset to a cell when it is configured with SUL and/or may apply such offset when (e.g., only when) the RX level (RSRP) or similar is below a threshold. The offset (e.g., a positive offset) applied to cells configured with SUL may be a function of the received RSRP.

A cell reselection criterion may be implemented based on speed. For example, when a high mobility level and/or a medium mobility level is detected, a WTRU may prioritize cells with configured SUL over cells operating with RUL alone (e.g., since an associated beamformed system may be less robust to mobility).

The offset temporarily applied to a cell (Qoffset$_{temp}$) may be scaled by an additional factor. This factor may (e.g., also) be a function of the RSRP measurement quantity used in the cell ranking criterion for neighboring and/or serving cells. For example, a cell having a high RSRP and no configured SUL may not be prioritized above a cell having a lower RSRP and configured SUL (and/or the cell with SUL may be prioritized over the cell without SUL).

When a high mobility or a medium mobility is detected by a WTRU, a positive bias to the serving cell signal strength (Q$_{Hyst}$) may be reduced by a configurable factor sf-High, which may correspond to a "Speed dependent ScalingFactor for Q$_{hyst}$". In an example involving high mobility, if the serving cell is supporting SUL, the WTRU may need to attenuate this bias reduction. For example, a bias reduction may be reduced by a configurable factor sf-High_SUL, which may correspond to an "Additional speed dependent ScalingFactor for Q$_{hyst}$". Further, in some examples, a timer for cell reselection may be scaled by an additional factor to increase the time of reselection if the serving cell is configured with SUL.

A WTRU may receive SUL related cell-selection parameters in a system information block (SIB). The WTRU may determine whether frequencies carriers and cells support SUL (e.g., to be able to characterize the quality of the target cell, including the quality of the SUL carrier). For example, the WTRU may receive SUL related cell-selection parameters defining the configuration of SUL in neighboring cells in the SIB of the camping cell. The WTRU may identify/differentiate the cells supporting SUL and apply the associated SUL related cell-selection parameters in the various selection/reselection criteria evaluations. These values may be one or more of the following: received as a neighboring cell list (e.g., with cell Ids of the various cells supporting SUL); received as a one bit information list which is mapped to the neighboring cell list received in a SIB (e.g., SIB5) for cell-specific selection parameters; received as an indication associated to the frequency carrier band configuration; based on stored information from previously detected cells; and/or requested by the WTRU when proximity to a cell supporting SUL may be detected.

A WTRU may receive in a SIB (e.g., SIB3) the common parameters for intra and inter-frequency cell reselection. Additionally, the WTRU may receive a SUL support neighboring list (e.g., in a SIB) containing the cell Ids of the neighboring cells supporting SUL. A WTRU may receive in a SIB (e.g., SIB5) the SUL related cell-selection parameters.

The WTRU may receive a list (interFreqNeighCellList_SUL) that indicates the cells with SUL related cell-selection parameters for which the WTRU may apply the SUL specific cell selection parameters. The WTRU may receive in a SIB (e.g., SIB5) a list mapped to IntraFreqNeighCellList indicating, for example, 0 for the neighboring cells not supporting SUL and 1 for the cells of the list supporting SUL, and/or a field indicating which cell-specific parameters are applied if the neighboring cell supports SUL.

The WTRU may keep an SUL support list of previously visited cells with SUL configured, and, for example, may use an autonomous search function to detect at least the previously visited cells whose Cell ID and associated PLMN identity may be in the WTRU's SUL support whitelist. The detection of proximity based on an autonomous search function may allow a WTRU to send a ProximityIndication_SUL message to indicate that the WTRU is entering or leaving the proximity of one or more cells supporting SUL. This function may be enabled if (e.g., only if) the WTRU is one or more of: high, experiencing a high attenuation in the downlink, and/or is in a high mobility state. If the WTRU detects one or more suitable cells in the SUL_Support_List, then the WTRU may reselect to one of the detected cells (e.g., irrespective of the frequency priority of the cell the WTRU is currently camped on (e.g., if the concerned SUL cell is the highest ranked cell on that frequency)).

A WTRU may maintain a SUL configuration in an RRC inactive state. A WTRU may maintain its dedicated RUL/SUL configuration while in an RRC_INACTIVE state. Such maintenance of the configuration may enable the WTRU to perform UL transmission while remaining in RRC_INAC-TIVE, and may avoid a number of WTRUs in RRC_INAC-TIVE state all using the same SUL configuration (e.g., and the same pool of RACH resources). Rules may be required for the WTRU to determine when to release its RUL/SUL configuration and use the RUL/SUL configuration in the RMSI instead. In some examples, the WTRU may maintain the RUL/SUL configuration, and release such configuration upon expiry of a timer.

The WTRU may release the RUL/SUL configuration upon occurrence of a mobility event, for example, reselection to another cell; reselection to another cell associated with a different RAN area; reselection to another cell which does not support SUL; and/or transmission of a periodic RAN Location Area Updated (RLAU) (e.g., to the same cell or when it is transmitted to a different cell).

The WTRU may release the RUL/SUL configuration upon a resume procedure to a cell (e.g., if it provides a new configuration for the RUL/SUL). A WTRU may use the stored dedicated configuration for access related to resume, and may replace the stored configuration with a new dedicated configuration provided (e.g., in the resume message or reconfiguration following the resume procedure).

A WTRU may perform SUL procedures relating to paging and initial access. A WTRU may determine an uplink carrier in which to perform initial access, for example, in response to paging, e.g., based on information provided in a paging message. A WTRU may receive an indication to perform initial access on an SUL or RUL. For example, the WTRU may receive the indication to perform initial access on a SUL or RUL in a paging message. Configured parameters for access on SUL/RUL may be provided in system information and/or stored in a dedicated configuration (e.g. INACTIVE state configuration). A WRTU may receive a paging record for which the signaled WTRU ID matches the WTRU's IDLE state ID. A WTRU (e.g. in RRC_IDLE) may receive an indication to perform initial access on an SUL or RUL. A WTRU may initiate an initial access procedure, for example, using the stored system information associated with the SUL/RUL configuration (e.g. RACH preamble/resources, carrier frequency, etc.). A WTRU may initiate an initial access procedure, for example, using stored information on an uplink carrier that may be indicated in the paging message. A WTRU (e.g. in RRC_INACTIVE) may obtain a SUL/RUL configuration, for example, from system information or by dedicated RRC signaling while the WTRU was in RRC_CONNECTED, which may be stored during transition to RRC_INACTIVE.

A WTRU may determine a UL carrier (e.g. SUL/RUL), for example, based on a combination of information, such as information that may be provided in a paging record in addition to one or more of the following: (i) measured quality (e.g. RSRP, RSRQ, etc.) of a DL carrier of a cell in which a paging may be (e.g. may have been) received; (ii) WTRU speed/velocity; (iii) WTRU battery power; (iv) WTRU maximum UL transmission power, and/or (v) other information.

Regarding WTRU speed/velocity, in an example, if the mobility of the user is fast (or above a threshold), the WTRU may select the SUL carrier. This may be more reliable and may allow the WTRU to transmit in wider beams associated to the SUL (e.g., instead of narrower beams associated to RUL resulting in often changes of beams).

Regarding WTRU battery power, a WTRU may select the UL carrier that would lead to the lowest power usage, for example, as follows: if the result of received power control plus the power adjustment for SUL (e.g., to compensate the difference between a pathloss estimate for the SUL frequency and the path loss estimated on the DL carrier in the cell) for UL transmission in SUL is a threshold higher than the received power control for RUL, the WTRU may select RUL carrier; inversely, if the received power control for RUL is a threshold higher than the result of the received power control plus the power adjustment for SUL, the WTRU may select the SUL carrier.

Regarding WTRU maximum UL transmission power, if the result of received power control plus the power adjustment for SUL is higher than the maximum output power of the WTRU, the WTRU may select the RUL carrier.

A WTRU may choose an indicated carrier (e.g. SUL or RUL), for example, when one or more conditions (e.g. for any of the above quantities) may be met. A condition may, for example, be based on the value of a quantity being above/below a threshold, which may be provided, for example, in system information, RRC configuration, and/or in a paging message, etc. The NW may manage a load of UL resources on SUL/RUL while taking into account the type of data to be transmitted to a WTRU in the DL (e.g. short data transmission, low latency data requiring a high reliability acknowledgement, etc.).

In an example, a WTRU may receive an RSRP threshold in the paging message that the WTRU may use to decide whether to perform initial access in response to paging on the SUL or the RUL. For example, if the cell quality is below the threshold provided in the paging message, the WTRU may perform initial access on the SUL, otherwise, it may perform initial access on the RUL. Such thresholds received in the paging message may override or be prioritized over any other thresholds received in system information from the cell.

A WTRU may determine the UL to use for access based on a combination of the forgoing without such information provided in the paging message, such as, for example, WTRU battery power or WTRU maximum UL transmission power.

A WTRU may use multiple thresholds for decision criteria. For example, a WTRU may be provided with multiple RSRP thresholds for deciding between initial access on SUL or RUL. A (e.g., each) threshold may be associated with a different access type, or similar factor relating to the access by the WTRU. The WTRU may determine the uplink on which to perform initial access (SUL or RUL) by identifying the appropriate threshold based on the access type. The WTRU may perform access on the SUL if the DL cell quality is below the associated threshold, or may perform access on RUL if the DL cell quality is above the associated threshold. A WTRU may associate a threshold (e.g., each of the thresholds) with one or more of the following factors: a WTRU type, or WTRU class, which may be statically defined for a WTRU (e.g. MTC WTRU) and may be defined based on the WTRU's capability; an access category, or service type defined at the higher layers (e.g., NAS or application layer); different connection establishment causes (e.g. tracking area update, DL data, resume from INACTIVE state, RAN area update); logical channel/priority of data in the WTRU buffer at the time of access, for example, for access from INACTIVE state; and/or amount of data in a buffer (e.g., for a specific logical channel) being above or below a threshold.

A WTRU may initiate access on SUL or RUL where the described factors may not be associated with a threshold. For example, a WTRU may initiate (e.g., may always initiate) access for a high priority logical channel (e.g., URLLC) on SUL, regardless of the threshold. In another example, the WTRU may (e.g., may always) perform RLAU on the RUL. Such special cases may be enabled by specific rules, or the WTRU may receive a special value of the threshold (e.g., negative or positive infinity) which may allow it to follow the described behavior.

A WTRU may perform (e.g. one or more portions of) an initial access, for example, based on a network indication. For example, the WTRU may receive from a network one or more indications of which parts of an initial access may be performed in SUL/RUL. The WTRU may (e.g. based on an indication in a paging message), for example, perform PRACH transmission on an RUL/SUL and may transmit MSG3 on the SUL/RUL. A WTRU may, for example, determine or assume a grant that may be received in MSG2 for UL transmission of MSG3 references resources in the carrier indicated in the paging message for MSG3 transmission. For example, the grant in MSG2 may reserve resources on the SUL, if the paging indicated that MSG3 should be transmitted on SUL, while it may reserve resources on RUL if the paging message indicated that MSG3 should be transmitted on RUL. The WTRU may, (e.g. based on an indication in a paging message) perform PRACH transmission on a RUL/SUL and/or may transmit MSG3 on a carrier that may be (e.g. explicitly) indicated in MSG2 (e.g. with a CIF or similar flag in MSG2 MAC CE).

During initial access, a NW may not have quality information (e.g. SRS transmission by a WTRU) to appropriately select a UL (e.g. SUL or RUL). A WTRU may, for example, provide UL selection information during an initial access procedure. Information that may be provided may include, for example, one or more of the following: (i) measured quality (e.g. RSRP, RSRQ, etc.) of a DL carrier of a cell; (ii) WTRU speed/velocity, and/or (iii) logical channel ID of data that triggered the access. The WTRU may provide this information to a network, for example, by one or more of the following ways: (i) in an RRC message or MAC CE that may be included with MSG3, and/or (ii) implicitly (e.g. based on selection of a RACH preamble/resource). The WTRU may be configured (e.g. in system information or by dedicated RRC signaling) to use a subset of RACH preamble/resources, for example, when WTRU speed may be above a threshold. The NW may utilize information (e.g. provided by a WTRU), for example, to select an appropriate UL (e.g. SUL or RUL) to configure the WTRU. The WTRU may receive (e.g. in MSG4 of an initial access/resume procedure) a configuration for a UL, which may include a UL to use SUL and/or RUL, for example, for subsequent communication with the NW.

When performing response driven paging, a paging indicator response performed on SUL may not be used by the NW to select a DL beam to transmit paging record. A WTRU may transmit beam information on an SUL. For example, the WTRU may provide beam information of the DL beam on a non-beamformed UL carrier (e.g. the SUL) to the NW, for example, during an initial access procedure. A WTRU may, for example, identify a beam, beam index or synchronization signal block (SSB) index that may be associated with correct reception of a paging indicator message. A WTRU may provide an identifier to a NW, for example, during a RACH procedure that may be performed on an SUL (e.g. a non-beamformed frequency). Information may be provided, for example, using one or more of the following procedures.

A WTRU may provide an identifier using (e.g. explicitly using) a data transmission or data part that may be appended to a PRACH preamble transmission. A WTRU may select a PRACH preamble/resource that may be associated with an identifier. A WTRU may, for example, be configured (e.g. through system information or dedicated RRC signaling) with a mapping of a PRACH preamble/resource on a non-beamformed UL carrier (e.g. SUL) for a given beam index on the DL (e.g. beamformed carrier). A WTRU may select a PRACH preamble/resource pair based on a configured mapping.

A WTRU may delay transmission of a PRACH preamble, for example, by an amount of time that may be related to the index decoded. A WTRU may, for example, be configured (e.g. through system information or dedicated RRC signaling) with a (e.g. specific) time delay to use for a (e.g. each) SSB beam index. A WTRU may, for example, select a time delay (e.g. number of subframes to wait) for transmission of a PRACH preamble, e.g., by a hardcoded amount that may relate (e.g. directly) to an index (e.g. index 1=1*x subframes, index 2=2*x subframes, etc.).

During handover, a WTRU may determine which carrier is RUL/SUL. A WTRU may receive configuration for multiple (e.g. two) UL carriers in a handover (HO) command (e.g. one corresponding to SUL and another corresponding to RUL). The network may provide an indication to indicate which configuration applies to which carrier. A WTRU may apply (e.g. subsequent) procedures/actions (e.g. during or after completion of an HO command), for example, depending whether an HO may be performed to a SUL or RUL. Knowledge of SUL/RUL may be derived by a WTRU that may, for example, use one or more of the following: (i) (e.g. explicit) indication in an HO command; (ii) presence/absence of beam-related information in an L1/L2 configuration and/or ARFCN. In an example (e.g. of ARFCN), a WTRU may consider (e.g. all) frequencies below a reference ARFCN to be an SUL. A WTRU may determine a configuration associated with an SUL to be the one with the lower value of ARFCN, for example, when a WTRU is provided with separate full configurations for SUL and RUL, or a full configuration for one carrier and a partial configuration for another carrier.

There are various procedures that may vary depending whether a WTRU completed an HO command on an RUL or a SUL. These procedures include, for example, one or more of the following: (i) UL carrier selection for an HO (e.g. behavior discussed herein may be subject to knowledge whether a carrier is SUL/RUL, which may be determined as described herein); (ii) HO failure procedure (e.g. a WTRU may perform a different action upon HO failure that may depend whether an HO may be first performed to an SUL or RUL); (iii) RLF/S-RLF procedure (e.g. a WTRU may perform different actions upon triggering RLF/S-RLF, or specific forms of RLF/S-RLF, for example, depending whether an HO may be performed via an SUL or RUL); (iv) re-establishment procedure (e.g., in the case of failed HO) or in the case of RLF following HO; (v) resume procedure following suspend; (vi) UL data and/or UL RRC routing and/or (vii) a system information request. The WTRU may receive an indication of the one or more procedures described above as part of an HO command and/or while the WTRU is in RRC Connected.

A WTRU may receive from a network uplink carrier selection information (e.g., SUL and/or RUL) in an HO command, and may select the uplink on which to perform initial access based on the information. For example, the WTRU may be provided with a carrier to use (e.g. SUL or RUL), e.g., to perform initial access during HO. An indication may be an explicit indicator of which carrier to use. A network may, for example, provide a UL configuration for SUL and RUL (e.g. in an HO command or in system information). A WTRU may perform initial access during HO with a configuration of an indicated carrier.

The WTRU may perform HO to a carrier that may contain (e.g. in the HO command) necessary information to perform initial access. The WTRU may receive from the network a (e.g. single) full configuration in an HO command (e.g. SUL or RUL). The WTRU may perform initial access on a carrier that may be associated with the configuration. The configuration may, for example, consist of initial access parameters (e.g. dedicated/common RACH resources). The configuration may (e.g. further) include configuration for a UL carrier (e.g. L1 configuration, L2 configuration, etc.), for example, to use during operation in RRC_CONNECTED mode. The WTRU may (e.g. in addition to a single full configuration) receive a (e.g. an additional) reduced configuration for another UL carrier (e.g. RUL or SUL), which may contain, for example, an ARFCN and SRS configuration for UL SRS transmissions following an HO command. The WTRU may (e.g. in this case) select a carrier on which a full configuration may be provided to perform initial access and may configures (e.g. only) SRS on another carrier.

The WTRU may perform initial access during HO to a carrier (e.g. SUL/RUL. The WTRU may operate or be configured with UL operation during and/or following HO completion in another carrier (RUL/SUL). The WTRU may (e.g. in this case) receive a RACH configuration for an SUL and a full configuration (e.g. L1, L2) for an RUL, or vice versa.

A WTRU may determine a carrier (e.g. SUL or RUL) on which to perform HO, for example, based on the state of the WTRU in a source cell (e.g. prior to an HO command). The WTRU may be configured with multiple (e.g. two) separate configurations (e.g. RUL and SUL) in a source cell but may be configured to use (e.g. only) a (e.g. single) configuration during the time of reception of an HO command. The WTRU may, for example, determine or assume the same UL (e.g. RUL or SUL) may (e.g. should) be used in a target cell. The WTRU may perform initial access to a target cell using the UL carrier. Alternatively or additionally, the WTRU may be configured with (e.g., only) SUL in the source cell, and the resulting selection by the WTRU of the UL for initial HO may be to select the SUL in the target cell (e.g., even though the WTRU may be provided both configurations in the HO command). The WTRU may, for example, (e.g. further) determine or assume a configuration in an HO command (e.g. to be used in a target cell) is associated with the same type of UL carrier (e.g. RUL or SUL) as the last configuration in the source cell. The WTRU may (e.g. additionally or alternatively) be configured to use both SUL/RUL in a source cell (e.g. according to NW scheduling). The WTRU may (e.g. in this case) use another procedure (e.g. as described herein) to select between SUL/RUL during HO. The WTRU may receive the configuration information for SUL and RUL in an HO command.

The WTRU may receive a common SUL configuration for source and target cells. The WTRU may determine or assume an actual SUL configuration of a target cell is the same as an SUL configuration of a source cell. The WTRU may make a determination or assumption, for example, based on one or more of the following: (i) a configuration; (ii) a relation of a target cell ID to a source cell ID, and/or (iii) an indication in an HO command (e.g. an explicit indication or implicitly (e.g. by the absence of an SUL configuration). The WTRU may utilize an SUL configuration of a source cell during an HO command and following HO, possibly until the WTRU is reconfigured with a new SUL configuration (e.g. through dedicated RRC signaling or during acquisition of system information).

The WTRU may determine an uplink (SUL and/or RUL) based on WTRU determined factors.

A WTRU may be provided with a full configuration for SUL and RUL. A WTRU may select a carrier for initial access for HO based on one or more conditions that may be measured/determined at the WTRU, for example, such as one or more of (e.g. any combination of) the following: (i) DL cell quality, such as RSRP, RSRQ, etc. (e.g. in comparison with a threshold that may be configured or hardcoded); (ii) WTRU speed/velocity, (e.g. in comparison with a threshold that may be configured or hardcoded); (iii) WTRU battery power (e.g. in comparison with a threshold that may be configured or hardcoded); (iv) WTRU maximum UL transmission power (e.g. in comparison with a threshold that may be configured or hardcoded); (v) logical channel ID(s) of data that may be pending in WTRU buffers and/or (vi) beam on which WTRU may have received an HO command.

In an example (e.g. of logical channel ID(s) of data that may be pending in WTRU buffers), a WTRU may perform UL access to an SUL, for example, when there is data in one or more WTRU buffers that may correspond to a (e.g. certain) set of logical channels that indicates a (e.g. certain) priority or delay criticality. A (e.g. minimum) priority level may be configured by a NW (e.g. in dedicated or broadcast signaling).

In an example (e.g. of a beam on which a WTRU may have received an HO command), a WTRU may be configured with a set of beam IDs for initial access to a target cell, and a correspondence of beam ID to SUL or RUL. A WTRU may determine a UL carrier to use, for example, based on a beam ID in which an HO command was received. A configuration may be target cell specific.

A WTRU may select one of a set of target cells based on SUL/RUL criteria. The WTRU may be provided with a target cell configuration for one or more cells, e.g., in an HO command. The WTRU may perform initial access to a target cell for an HO, for example, based on measurements performed a (e.g. each) candidate target cell, e.g., at reception of an HO command. The WTRU may perform an HO to a target cell that may have a better DL cell measurement (e.g. RSRP) at the time of an HO command. The WTRU may (e.g. in the context of SUL/RUL selection) select a target cell for which the selection of RUL/SUL may result in a selection of the RUL by the WTRU.

A load on an SUL may be reduced, for example, when an HO may prioritize to cells for which a WTRU may not require use of an SUL at the time of an HO. A decision by a WTRU (e.g. compared to an NW decision) may be more accurate (e.g. since measurement may be performed at the time of an HO command) and may be combined with other factors (e.g. WTRU specific factors) to which an NW may not have access (e.g. speed, beam information, etc.).

The WTRU may use a timer-based fallback to a SUL during an HO procedure. The WTRU may initiate an HO procedure to an RUL and may fallback to performing an HO to a SUL, e.g., following a condition. For example, the WTRU may initiate an HO to an RUL. The WTRU may be configured with a timer that determines when to fallback to an SUL. The WTRU may start a timer at reception of an HO command. The timer may be started, for example, (e.g. only) when a WTRU selects RUL for initial access during an HO. The WTRU may perform an HO to a RUL while a timer may be running. The WTRU may attempt an HO to a target via an SUL, for example, upon expiration of a timer. The timer may or may not be equivalent to an HO failure timer (e.g. T304).

In an (e.g. additional or alternative) example (e.g. which may be used in combination with another example), a WTRU may be (e.g. further) configured with a second timer. The second timer may dictate an amount of time that a WTRU may attempt an HO on an SUL before an HO failure may be declared. The WTRU may start a timer, for example, when it initiates fallback to an SUL. The WTRU may attempt an HO to a target cell, for example, via an SUL until a second timer may be running. An HO failure may be declared, for example, upon expiration of the second timer.

The WTRU may implement fallback to contention-based (common) resources during HO. For example, following failure to perform HO on dedicated (CFRA) resources provided by the NW, the WTRU may fallback to contention-based random access resources, and may select such resources on either SUL or RUL. The WTRU may base its selection decision on whether the dedicated resources were provided on the SUL or the RUL.

The WTRU may select the same UL (SUL or RUL) as the UL in which it received the dedicated resources for CFRA. For instance, if the WTRU receives dedicated resources on the RUL/SUL, and HO fails on the dedicated resources, the WTRU may fallback on contention-based resources on the RUL/SUL. The WTRU may (e.g., may always) use the UL resources associated with the SUL, assuming such resources are provided by the network. The WTRU may use the RUL resources if the SUL resources are not provided. The WTRU may determine the UL carrier to use based on the measured DL quality at the time of the HO or HO failure on the dedicated resources. For example, if the WTRU is provided with common resources on both SUL and RUL in the HO command, the WTRU may perform fallback to the SUL resources when the DL cell quality is below a threshold, and may perform fallback to the RUL otherwise. In the described criteria, HO failure on dedicated (CFRA) resources may include a failed RACH procedure or attempt, or it may include a beam associated with the dedicated RACH resource being below a configured threshold.

The WTRU may base fallback to SUL on beam suitability and/or prioritizing contention-free access. The WTRU may fallback to attempting an HO on an SUL (e.g. following initial attempts on an RUL), for example, when there may no longer be any beams on an RUL that may satisfy a (e.g. specific) suitability criteria.

Alternatively or additionally, the WTRU may (e.g. first) perform an HO on one or more dedicated resources (e.g. beams) of an RUL, e.g., as may be provided by an HO command, for example, when one or more of those beams may be measured to be above an associated threshold (e.g. provided in an HO command). The WTRU may (e.g. prior to an HO attempt or during HO attempts to a target on dedicated RACH resources such as beams), determine that a quality of (e.g. all) dedicated RACH resources fall below a configured threshold. The WTRU may initiate an HO procedure on an SUL (e.g. using an SUL configuration). The WTRU may (e.g. further) perform fallback to an SUL (e.g. only), for example, when (e.g. on condition that) it may be provided with a dedicated RACH configuration (e.g. contention-free resources) on the SUL.

In an (e.g. additional or alternative) example, a WTRU may (e.g. first) perform an HO on one or more dedicated resources (e.g. beams) on an RUL (e.g. provided in an HO command), for example, when one or more of the beams have a quality above a threshold. A WTRU may (e.g. when a beam does not have a quality above a threshold) use a beam in a common configuration (e.g. associated with contention based random access) of an RUL, for example, when one or more beams/resources may have a quality above a (e.g. the same or different) threshold. A WTRU may (e.g. then) fallback to performing initial access for an HO on an SUL, for example, when no beams/resources on an RUL (e.g. common or dedicated) may have a quality above a threshold.

A WTRU may request a change of a UL carrier based on one or more factors. A WTRU may request that an NW change a UL. The WTRU may be configured to utilize a (e.g. only one) UL (e.g. an RUL). A WTRU (e.g. as configured) may request that a network change its UL to another carrier (e.g. SUL).

Initiation of a request or change of a UL may, for example, be based on one or more conditions, such as one or more of the following: (i) DL quality of a cell; (ii) speed of a WTRU; (iii) current WTRU battery power, and/or (iv) the arrival of high-priority data. In an example, a WTRU may request or change a UL (e.g. change from an RUL to an SUL) at some time after receiving a reconfiguration command, for example, when a measured quality of a DL may be below a threshold (e.g. configured by a network). In an example, a WTRU may request or change a UL (e.g. change from an RUL to an SUL), for example, when the WTRU speed may (e.g. start) to exceed a network-configured threshold. In an example, a WTRU may request or change a UL (e.g. change from an RUL to an SUL), for example, when remaining WTRU battery power may be below a threshold (e.g. configured by a network).

In an example, a WTRU may request or change a UL (e.g. change from an RUL to an SUL), for example, when a packet may arrive on a (e.g. certain) logical channel or radio bearer at a WTRU, where a priority of the packet may be above a (e.g. certain) priority level. A WTRU may trigger a change in a UL (e.g. RUL to SUL), for example, when a new data packet may arrive at an SDAP/PDCP layer that may be associated with a (e.g. specific) QoS level or may be mapped to a (e.g. specific) radio bearer. A QoS level and/or radio bearer (e.g. which may trigger a change procedure) may be configured by a network.

In an (e.g. additional or alternative) example (e.g. which may be used in combination with another example), a WTRU may (e.g. further) be provided with a time validity for an SUL configuration and an associated condition. A WTRU (e.g. upon receipt of a conditional configuration), may start a timer and may evaluate one or more conditions, for example, when the timer is running. A WTRU may (e.g. upon expiration of a timer) delete a received configuration and stop evaluation of one or more associated conditions.

WTRU behavior may adapt based on a triggering condition. For example, the WTRU may (e.g. in foregoing examples) inform lower layers of a need to switch to an SUL. A WTRU may (e.g. further) initiate a procedure in lower layers that may be associated with informing an NW of a UL switch. Upper layer(s) may initiate one or more lower-layer procedures such as, for example, one or more of the following: (i) initiation of a RACH procedure or RACH-like procedure in an SUL; (ii) transmission of an RRC message on a currently configured UL (e.g. RUL); (iii) transmission on a PUCCH (e.g. SR or other indication) on an SUL (e.g. when resources may be configured), and/or (iii) transmission of an RRC message on a master node (e.g. eNB/gNB), for example, when a WTRU may be configured with DC and/or when RUL/SUL configurations may be associated with transmission on a secondary node (SN) (e.g. gNB).

A WTRU may transmit a switch indication to a network. An indication may be, for example, an RRC message transmitted to the network. An indication may provide information such as, for example, one or more of the following: (i) an indication of a switch request (e.g. to differentiate from a RACH procedure for other purposes); (ii) a cause for the switch (e.g. condition satisfied causing the switch); (iii) measurements that may be associated with the switch (e.g. measurements of DL quality, WTRU speed, etc.), and/or (iv) expected/determined duration for utilization of an SUL and subsequent switch back to an RUL (or vice versa).

For example, the WTRU may transmit a switch indication message in MSG3 of a RACH procedure or RACH-like procedure to an SUL, e.g., to indicate a switch to SUL to a network. In an (e.g. additional or alternative) example, a WTRU may transmit a switch indication message as an RRC message on an RUL, or as an RRC message to an MN (e.g. when a switch to SUL may be associated with an SN).

The WTRU may include data and/or signaling in MSG3 (included in the switch indication). In an example, the WTRU may wait for reception of a confirmation by the NW and may transmit the data and/or signaling (e.g., which may have triggered transmission of the switch indication over the SUL) once the WTRU is switched to the SUL (by DCI or RRC configuration).

The WTRU may receive a switch indication confirmation. For example, a WTRU may (e.g. following transmission of a switch indication message) receive a switch confirmation from a network. A switch confirmation may confirm use of an SUL by a WTRU or refuse a request. A WTRU may (e.g. upon receiving a positive confirmation) initiate utilization of an SUL (e.g. for transmission of data). A WTRU may (e.g. further) receive (e.g. in a switch indication confirmation message) a configuration (e.g. L1/L2) that may be used on an SUL. Alternatively or additionally, the WTRU may receive a switch indication confirmation message in MSG4 of a RACH procedure that may be performed on an SUL.

A UL change/reconfiguration may be conditional. An NW based decision for change (e.g. from RUL to SUL) may be based (e.g. primarily) on WTRU transmission of an SRS and DL signaling (e.g. RRC, MAC/DCI) for reconfiguration, which may not handle fading/blocking that occurs faster than an SRS period, and which may affect successful transmission of where URLLC data may need to be sent in a UL.

A WTRU may change a UL, for example, based on a configured condition. For example, a WTRU may be provided with a configuration (e.g. in a dedicated RRC or system information) of an SUL and may initiate or trigger a switch from usage of an RUL to usage of the SUL while operating in RRC_CONNECTED mode, for example, a time after reception of the reconfiguration or switch message. A switch may occur, for example, as a result of one or more conditions being satisfied at a WTRU. Conditions may, for example, be the same as conditions for requesting a switch from a network. A WTRU may apply a switch or reconfiguration, for example, (e.g. only) when it may (e.g. does) occur within a configured time period following reception of a switch or reconfiguration. A WTRU may (e.g. further) receive a condition as part of a configuration of an SUL. A WTRU may utilize an RUL for a period of time during which a condition associated with a switch may be satisfied. A switch from SUL to RUL may be initiated, for example, when a condition may no longer be satisfied. A WTRU may (e.g. additionally or alternatively) stay configured on an SUL for a predefined or configured period of time, after which, the WRTU may move back to utilizing a previous configuration of an RUL. A WTRU may (e.g. additionally or alternatively) move back to utilizing an RUL, for example, based on a different condition that may be related to an initial condition for utilization of an SUL (e.g. successful transmission of a high priority packet).

The WTRU may be configured with uplink semi-persistent scheduling across SUL/RUL. The WTRU may be configured with fast relocation of UL SPS from an RUL to an SUL, and vice versa. A WTRU may be configured with a semi-persistent schedule configuration applicable to RUL and SUL. In an example, a WTRU may be configured with a (e.g. single) SPS-config that may be associated with RUL and SUL. In an (e.g. additional or alternative) example, a WTRU may be configured with multiple (e.g. two) separate SPS-configs (e.g. a first SPS-config may be associated with RUL and a second SPS-config may be associated with SUL).

A WTRU may be (e.g. further) configured to determine whether a UL-grant is associated with an SPS-config is applicable on an RUL and/or SUL. In an example, a WTRU may be (e.g. explicitly) signaled that one or more configured SPS grants are applicable on a (e.g. specific) UL carrier (e.g. RUL or SUL).

A WTRU may be configured to perform (e.g. fast) relocation of a UL SPS from an RUL to an SUL and vice versa, for example, based on implicit rules or explicit command. Relocation may refer to suspending an SPS config that is applicable for a first UL carrier and applying an SPS-config that is applicable for a second UL carrier.

In an example, a WTRU may be configured to suspend an SPS-config that is applicable for an RUL and apply an SPS-config that is applicable for an SUL, for example, upon receiving a reconfiguration command, e.g., in an MAC CE, RRC signaling or L1 signaling.

In an (e.g. additional or alternative) example, a WTRU may autonomously perform a relocation, for example, when a UL SPS is configured for an SUL and/or one or more preconfigured conditions are satisfied. Conditions may include, for example, determining a quality of a DL below a threshold, DL pathloss below a threshold, when UL SPS retransmissions exceed a predetermined threshold, etc. Conditions, which may be preconfigured, may include other trigger conditions that may be applicable for an SUL switch.

A WTRU may be configured, for example, to use SPS UL grants on RUL and SUL, e.g., for increased reliability/diversity. A WTRU may apply duplication or alternating transmissions, for example, using a predefined hopping pattern across an SUL and an RUL.

The WTRU may confirm SPS relocation. A WTRU may be configured to acknowledge (e.g. in an explicit case) or indicate (e.g. in an implicit case) an SPS relocation, for example, by transmission of a MAC CE, RRC signaling or L1 signaling (e.g. SRS transmission) on a relocated UL carrier. A WTRU may transmit an acknowledgement on an SUL carrier, for example, upon receiving an SPS relocation command from RUL to SUL.

A WTRU may be configured for SPS resources and/or to receive a dynamic grant. A WTRU may be configured with SPS resources (Type 1 or Type 2 resources) on either or both ULs. A WTRU may receive (e.g., further receive) a dynamic grant on the same transmission interval for one of the two uplinks configured in the WTRU.

A dynamic grant may enable transmission redundancy. In an example, a WTRU that receives an UL grant on the non-SPS carrier (e.g., a dynamic UL grant on SUL when SPS is configured on RUL or vice versa) may perform duplicate transmission of the data (e.g., transport block) on both the SUL and RUL. A WTRU may be configured with one or a set of logical channels on which such duplication behavior should be applied. A WTRU may perform such duplication behavior if, for example, there is data pending for such logical channels at the time of reception of such dynamic grant, and if not, may otherwise cancel the SPS grant.

A dynamic grant may enable cancellation of a set of grants. In an example, a WTRU that receives an UL grant on the non-SPS carrier may cancel the current grant as well as a number of upcoming SPS grants. The dynamic grant received by the WTRU (which results in cancellation of the SPS grants) may need to be sent for the same transmission interval as one of the SPS grants. The number of SPS grants to be cancelled may be determined in one or more of the following: (i) the WTRU may cancel a number of SPS grants indicated (by some value) in the dynamic grant itself ((e.g. value in the DCI message). After skipping or cancelling the signaled number of grants on the UL carrier configured with SPS, the WTRU may start using the grants based on the same configuration); (ii) the WTRU may cancel all SPS grants until the reception of NW signaling from the NW that re-enables the SPS grants.

In an example, the NW signaling that re-enables the SPS grants may be in the form of a dynamic grant on the UL with the configured SPS resources. For example, the WTRU with SPS configured on the RUL may receive a dynamic grant for the SUL on the same transmission interval as one of the SPS grants. The WTRU may cancel that SPS grant, as well as all further SPS grants on the RUL until it receives another dynamic grant for UL resources on the RUL again.

In an example, the NW signaling that re-enables the SPS grants may be in the form of a DCI message used specifically to re-activate the SPS resources. This may be a DCI used for SPS activation (e.g., DCI addressed to CS-RNTI) or may be some other dedicated NW signaling. For example, the WTRU with SPS configured on RUL may receive a dynamic grant for the SUL on the same transmission interval as one of the SPS grants. The WTRU may cancel that SPS grant, as well as all further SPS grants on RUL until it receives an SPS activation message (e.g., DCI message addressed to CS-RNTI) to re-activate the previously configured SPS grant.

A WTRU may cancel all SPS grants for as long as the WTRU's measured DL RSRP is below a threshold. The WTRU may indicate to the NW through some UL transmission (e.g., RACH or SRS like) when the DL RSRP may move above the threshold and the WTRU resumes using the SPS grants.

A WTRU's described behavior may depend on which UL (SUL or RUL) the SPS resources are configured for. A WTRU's described behavior may (e.g., may also) depend on the type of SPS resources (e.g., Type 1 CS or Type 2 CS).

In an example, where a dynamic grant cancels a set of grants, if the SPS resources are configured on the RUL and the dynamic grant is for the RUL, the WTRU may perform cancellation of the SPS grants as described. If the SPS resources are configured on the SUL and the dynamic grant is provided for the RUL, the WTRU may cancel (e.g., only) a single grant (as in the case of LTE).

In an example, where a dynamic grant cancels a set of grants, the trigger for re-enabling or re-starting the SPS grants may depend on whether the SPS grants are associated with Type 1 CS (e.g., RRC defines the grant and no PDCCH is needed) or Type 2 CS (e.g., RRC defines the periodicity of the CS grant and PDCCH addressed to CS/SPS-RNTI activates the CS grant). With Type 1, the WTRU may re-enable the SPS grants following cancellation (e.g., when it receives a dynamic grant for an UL on RUL). With Type 2, the WTRU may re-enable the SPS grants following cancellation (e.g., when it receives a DCI addressed to CS/SPS-RNTI that activates the SPS).

Various mechanisms may be used to assist with routing and reliability of control signaling (e.g. RRC signaling).

A WTRU may be configured to perform duplication of RRC messages on an RUL and an SUL.

The WTRU RRC layer may inform lower layers that an (e.g. a specific) RRC message passed to lower layers may (e.g. should) be duplicated on an RUL and an SUL. The WTRU may determine to perform duplication of RRC messages on the RUL and SUL based on one or more of the following: (i) the WTRU is configured with an RUL and an SUL; (ii) the WTRU is configured with an RUL and an SUL, and both are active (e.g. PUSCH scheduling on either UL is possible); (iii) DL cell quality of a cell in which an RUL and an SUL is configured is below or above a threshold; (iv) an RRC message is a specific type (e.g. measurement report), and/or (v) measurements associated with a measurement report follow a condition for duplication of the messages.

The WTRU (e.g., the RRC layer) may indicate when a condition for duplication is no longer be enabled. The lower layers of the WTRU may perform duplication for (e.g. all) RRC messages during a time when duplication is enabled. For example, the lower layers may perform duplication by transmitting in an RUL and an SUL, for example, when scheduled on either carrier. The lower layers may (e.g. additionally or alternatively) perform a procedure to notify a network of a need for resources in both the RUL and SUL (e.g. RACH procedure, SR procedure, etc.), for example, when the WTRU is configured on both but active on only one, or when the WTRU is configured on one of the RUL or the SUL.

The WTRU and/or the network may switch the UL path for RRC signaling. The WTRU may be configured to switch the UL path (from RUL to SUL, or vice versa) associated with transmission of RRC signaling. For example, the WTRU may be configured to transmit RRC signaling on one of the two ULs at a given time, and may be configured to change the UL for such message based on a certain event. The change of UL may be applicable to (e.g., only to) RRC signaling. The change of UL may be applicable to (e.g., only) a specific type(s) of RRC message, for example, one or more of the following: a measurement report; a measurement report triggered by a certain type of event; and/or a measurement report satisfying certain conditions on the measurement quality, triggering time, etc.

In an example, the WTRU may change the UL for transmission of RRC messages by transmitting the RRC message when (e.g., only when) scheduled on the SUL, or when the NW switches the WTRU to the SUL. The WTRU may proactively request an UL switch to the other UL in order to transmit the RRC message on the other UL. The WTRU may transmit a switch indication (e.g., RACH on SUL) when requiring a change in the UL for RRC signaling. The WTRU may (e.g., may further) indicate that such switch applies (e.g., only) to RRC signaling.

The WTRU may determine that an RRC message should be transmitted on a different UL (e.g., switch from RUL to SUL) based on one or more of the following conditions: (i) a measured DL quality of the cell goes below (e.g., or above) a threshold; (ii) a WTRU speed is below (e.g., or above) a threshold; (iii) a maximum UL transmission power is below (e.g., or above) a threshold; (iv) a WTRU battery power is below (e.g., or above) a threshold; (v) the RRC message is transmitted on SRB1/SRB2; and/or (vi) the RRC message is of a specific type (e.g., measurement report) with specific criteria (e.g. associated with a specific measurement event).

A UL path may be selected for RRC signaling in dual connectivity (DC). The WTRU may be configured with any form of DC (e.g. NR-NR DC, EN-DC, etc.). The WTRU may decide a UL path for an RRC message, for example, based on a DL quality of a PSCell or SCell on an SN. The WTRU may (e.g. when DL quality on an SN may be acceptable) transmit an RRC message to an SN. The WTRU may (e.g. otherwise) transmit an RRC message to an MN, for example, when a DL quality on an SN may not be acceptable.

The WTRU may be configured with an SRB3 and may split SRB1/2 (e.g. anchored at the MN). The WTRU may transmit RRC messages on SRB3, for example, when a measured DL quality of an SN PSCell may be above a (e.g. configured) threshold. The WTRU may transmit RRC messages on SRB1/2, for example, when a measured DL quality of an SN PSCell may be below a threshold. The WTRU may (e.g. when transmitting an RRC message on SRB1/2) encapsulate an NR RRC message in an LTE RRC message, for example, when the WTRU is configured with an EN-DC. The WTRU may (e.g. further) apply a determination (e.g. only) for RRC messages that may (e.g. normally) be transmitted on SRB3 (e.g. measurement reports related to measurement configuration configured by an NR SN).

In an (e.g. additional or alternative) example, a WTRU (e.g. configured with SRB3 and split SRB1/2) may transmit an RRC message (e.g. intended for an SN) on SRB1 (e.g. to an MN via a transparent container), for example, when the WTRU is configured with an RUL in an SN or has (e.g. only has) an RUL activated in the SN, and the DL quality of the SN (e.g. PSCell) is below a threshold configured for RUL usage (e.g. a threshold to determine whether an RUL or SUL may be used for initial access or another threshold to determine whether an RUL or SUL may be chosen).

The WTRU and/or the network may have Radio link failure (RLF) and associated error procedures for a SUL. The WTRU may be configured to send beam recovery requests, for example upon detecting problems with one or more uplink and/or downlink beams. For example, a beam failure may be detected at the WTRU (e.g., by the lowers layers). The WTRU may initiate a random access (RA) procedure for beam failure recovery (BFR). An UL transmission in a regular frequency carrier may not permit the WTRU to transmit the preamble associated to the selected reference signal successfully to the gNB.

The WTRU may (e.g., when performing random access for BFR) apply one or more of the following procedures: perform the BFR first in RUL and then in SUL; perform the BFR in SUL (e.g., immediately after beam failure is declared if SUL is configured); select a UL based on the configuration of dedicated RACH resources in either uplink (e.g., utilize an UL in which the WTRU has a valid dedicated RACH configuration); and/or transmit the preamble in the RUL and receive grants for both ULs.

The WTRU may perform the BFR first in RUL and then in SUL. In such an example, performing BFR in the SUL may be used as a fallback procedure after a certain condition is reached on RUL. For example, one or more of the following may occur when performing BFR in the RUL that may trigger the WTRU to perform BFR in the SUL: a specific timer may expire; a certain number of attempts may be reached; and/or a certain power of transmission may be reached.

In an example where the WTRU selects a UL based on the configuration of dedicated RACH resources in either uplink, one or more of following may occur: the WTRU may first perform contention-free RA (CFRA) in the UL (e.g., RUL or SUL) where dedicated RACH resources are configured/available; the WTRU (e.g., if unsuccessful) may perform the contention-based RA (CBRA) in RUL. If CFRA resources are configured in both uplinks, a priority may be given and the WTRU may perform CFRA in order of priority.

A purpose of a beam failure recovery request procedure may be to indicate to the serving gNB of a new SSB or CSI-RS when beam failure is detected on the serving SSB(s)/CSI-RS(s). A transmission in the configured SUL may not allow the gNB to identify the strongest beam where the preamble is transmitted. An indication to the NW may be necessary to determine which SSB or CSI-RS in DL may (e.g., should) be used in the DL transmissions.

An indication to the NW (e.g., gNB) may be handled by one or more of the following: the configured preambles in SUL may be mapped to SSB or CSI-RS of the same cell; the WTRU may indicate to the NW which DL beam is the strongest (e.g., by transmitting the beam ID associated to the strongest SSB or CSI-RS in msg3); and/or the WTRU may send an RRC message to the gNB on SUL indicating the strongest DL beam or containing the associated measurement results.

The WTRU may be configured with dedicated RACH resources mapped to SSBs and/or CSI-RS resources in the cell. The WTRU may select a preamble in SUL that may be associated to a specific SSB or/CSI-RS beam in which it may receive the RAR and msg4.

The WTRU may transmit the preamble in a beam in the regular frequency carrier, and may receive (e.g., in msg2) a grant for both SUL and RUL. If dedicated RACH resources are configured in only one uplink, the WTRU may transmit the preamble in the carrier where the dedicated resources are configured. If dedicated RACH resources are configured in both uplinks, the WTRU may attempt CFRA on a suitable beam associated to a dedicated RACH resource in RUL (if available) and fallback to SUL (e.g., only if one of the defined conditions are met). If dedicated RACH resources are configured in both uplinks, the WTRU may attempt on SUL (e.g., if no suitable beam associated to a dedicated RACH resource in RUL is available), before fallback to CBRA in the RUL.

The WTRU may be configured with a threshold for suitability criteria of the beams associated to CSI-RS or SSB. If RSRP associated to any beam is above the threshold, the WTRU may perform CBRA (e.g., and if unsuccessful declares RLF). In an example, a WTRU may be configured with a second threshold higher than the beam suitability threshold (e.g., allowing the WTRU to select the SUL carrier for a beam failure recovery request before performing CBRA in RUL).

The WTRU may monitor the quality of the beams associated to SSB and CSI-RS in the cell. If RSRP of one or more beams are above the suitability threshold (but not the second threshold (e.g., SUL)), this may indicate to the gNB that the quality of the downlink transmission is sufficiently good for the DL reception in the current bandwidth parts and frequencies configured to the WTRU, but not sufficient for a preamble transmission in RUL. The WTRU may consequently use SUL for the RA procedure.

Radio Link Failure may occur on the master cell group (MCG). The WTRU may be configured with an UL/RUL on an MCG. The condition for triggering RLF may depend on a configuration and/or activation state of an RUL/SUL. A WTRU that triggers RLF on an MCG (e.g. in LTE) may initiate a re-establishment procedure. RLF may be triggered, for example, by one or more of the following: (i) a maximum number of RLC retries reached for an MCG DRB, (ii) random access problems that may be indicated by an MCG MAC and/or (iii) T310 expiration, e.g., following detection of sync problems that may be detected in L1.

A WTRU may have different behavior in response to one or more RLF-related triggering conditions, for example, based on a configuration of an RUL/SUL. WTRU behavior may, for example, depend on a configuration and/or activation of an RUL/SUL (e.g. whether RUL and SUL are fully configured in the WTRU, or only one is configured by RRC, and/or whether a WTRU may be currently indicated to use only a single UL). A WTRU may (e.g. in response to an associated condition that may correspond to RLF) trigger RLF and initiate re-establishment, or perform one or more (e.g. a combination of) alternate or additional actions. Alternate/additional actions may include, for example, one or more of the following: (i) initiate a switch or request to use an SUL, or indicate to lower layers to initiate such a procedure (e.g. based on one or more examples discussed with regard to an HO procedure); (ii) start a timer and wait for an NW command to switch to another UL (e.g. SUL) and trigger RLF followed by re-establishment, for example, following expiration of a timer without receipt of a command from the NW; (iii) initiate transmission of an RRC message on an SCG SRB (e.g. when a WTRU has an SCG SRB configured); (iv) initiate an action that generated a triggering condition (e.g. perform random access, or retry transmission in RLC) on another UL (e.g. SUL), and possibly when another UL may currently be configured; (iv) start a timer, during which a WTRU may continue DL reception on a PCell, but may delay a UL transmission on a PCell until it may receive an NW command (e.g. RRC, MAC CE, or L1) to switch a UL to a different carrier. A WTRU may declare RLF and initiate re-establishment, for example, following expiration of a timer without receipt of a command from the NW; and/or (v) indicate (e.g. to lower layers) to reset counters associated with an RLF (e.g. number of RLC retries, number of PRACH transmission attempts).

The WTRU may trigger an RLF and initiate a re-establishment procedure under one or more RLF-triggering conditions, for example, (e.g. only) when the WTRU may be configured with RUL and SUL and both are activated. A WTRU may initiate a RACH procedure or RACH-like procedure on an SUL, for example, when the WTRU may be configured with (e.g. only) RUL, or may be configured with both RUL and SUL but indicated to use (e.g. only) RUL. A WTRU may use RACH-resources that are associated with an SUL configured in dedicated or broadcast signaling to initiate a RACH procedure on an SUL.

The WTRU may trigger RLF and initiate re-establishment, for example, when the WTRU is configured only with RUL, or configured with RUL and SUL but indicated to use (e.g. only) RUL. The WTRU may trigger RLF and initiate re-establishment, for example, when conditions that meet RLF are associated (e.g. only) with DL problems (e.g. IS/OOS). The WTRU may perform one or more (e.g. foregoing) actions, for example, when RLF triggering conditions are associated with reaching a maximum number of RLC retransmissions, or are associated with RACH problems that are indicated by a MAC entity.

The WTRU may implement a variety of different combinations, for example, in terms of triggering conditions for RLF depending on the configuration and/or activation state of RUL/SUL, outcomes, and actions.

The WTRU may trigger RLF based on a DL cell quality compared with a threshold. In an (e.g. additional or alternative example that may be used in combination with one or more other examples), the WTRU may have different behavior in response to one or more RLF-triggering conditions, for example, based on cell quality at the time of or prior to RLF-triggering conditions. A decision at a WTRU may, for example, be based on whether cell quality during the time period may be above or below a configured threshold. The WTRU may trigger RLF and initiate re-establishment, for example, when a measured quality of a serving cell DL may be above a threshold at or prior to a time that RLF-triggering conditions may be met. The WTRU may perform one or more (e.g. foregoing) actions, for example, when cell quality may be below a threshold at the time of RLF-triggering condition and/or at any time (e.g. a time instant or entire time period) prior to the RLF-triggering condition.

The time period may be configured by a network. The time period considered in a WTRU decision may be specific to a type of RLF triggering condition. The WTRU may, for example, maintain a (e.g. continuous) measure of cell quality of a DL cell. The WTRU may determine the time period (e.g. for use in deciding whether to trigger RLF and perform re-establishment or to perform one or more actions), for example, based on a specific trigger (e.g. time1 may be associated with max RLC retransmissions, time2 may be associated with RACH problems, etc.). Examples of triggering RLF (e.g. based on one or more conditions) may be implemented by a WTRU and/or the NW in a variety of different combinations.

The WTRU may reset RLF-related counters/timers (e.g. at switch of UL). For example, the WTRU may reset counters and/or timers that may be associated with RLF determination, for example, during an indication to switch a UL. The WTRU may reset the counters during (e.g. only during) a switch from a first UL type to a second UL type (e.g. RUL to SUL). The WTRU may not reset the counters during a switch in the opposite direction (e.g., SUL to RUL).

The WTRU may receive a command (e.g. from a network) to switch from an RUL to an SUL. The command may be received, for example, by an RRC message, a MAC CE or a DCI command in L1. The WTRU may (e.g. in response to a command) reset a current value of an RLC retransmission counter that is used for RLF determination. For example, the WTRU may reset the counter that is associated with RACH problems (e.g. a RACH preamble transmission counter) or the like. The RRC layer of the WTRU may provide an indication (e.g. to a MAC layer) to reset a counter, for example, upon reception of a message.

The WTRU may suspend RLF related counters/timers based on DL cell quality. The WTRU may avoid incrementing one or more timers/counters (e.g. associated with RLF determination), for example, when the WTRU determines a cell quality of a DL is below a threshold. A WTRU may avoid an increase of counters/timers, for example, for a UL operation performed (e.g. only) on an RUL. The threshold may, for example, be the same threshold that is configured for an SUL activation for initial access.

The WTRU may not increment an RLC retry counter, for example, when an RLC retransmission is performed while the WTRU is configured to use (e.g. only) an RUL, and/or when a retransmission has occurred during a period of time in which a measured DL cell quality has been below a threshold.

The RRC layer of a WTRU may indicate to lower layers (e.g. RLC, MAC, or PHY) at what time RLF related counters or timers may be suspended by the lower layers and when a counter/timer increase may be enabled. An RRC layer may make a determination, for example, based on measurements of DL cell quality of a serving cell.

The WTRU may implement one or more procedures to handle RLF on a SCG when configured with (e.g. or configurable with) a SUL. The WTRU may be configured with SUL/RUL on an MCG. Although described with reference to a SCG, the examples described may (e.g. also) be applicable to RLF on a MCG.

The WTRU may report in an SCG failure information message. For example, the WTRU may provide information in an SCG failure information message that may be sent to an MN, e.g., to inform the MN whether the SCG failure occurred due to an RLF triggering condition on an RUL or an SUL. The MN may inform an SN of a need to configure or switch a UL of a PSCell for a WTRU to an SUL, for example. Information reported in an SCG failure information message may include, for example, one or more of the following: (i) a UL carrier (e.g. RUL or SUL, or ARFCN) on which an RLF triggering condition has occurred (e.g. RLF due to max RLC retries while on an RUL); (ii) configuration information of an RUL/SUL at the time of or prior to an RLF (e.g. a WTRU may indicate a configuration condition of an RUL/SUL such as being configured on a single UL, configured on both ULs but indicated to use only one, or configured on both ULs and allowed to use both based on scheduling); and/or (iii) one or more (e.g. a set of) measurements of DL quality of a PSCell at the time of an RLF-triggering condition, or during a (e.g. configurable) time period prior to an RLF-triggering condition.

The time period may be configured by a network. The time period may be different for different RLF-triggering conditions. The time period may be determined by a nature of an RLF-triggering condition itself. In an example (e.g. for a max number of RLC retries on an SCG bearer), the time period may start at a first RLC retransmission and may end when a maximum number of RLC retransmissions may be reached. The WTRU may, for example, provide multiple measurements at predefined intervals during a (e.g. an entire) time period.

Partial failure of an SCG may occur based on configuration of an RUL/SUL. The WTRU may (e.g. in one or more cases) suspend SCG transmissions, for example, depending on an RUL/SUL configuration on an SN and upon one or more conditions that may trigger an SCG failure. The WTRU may (e.g. in other cases) perform one or more (e.g. a combination of) actions such as, for example, one or more of the following: (i) initiate a switch or request to use an SUL on an SN, or provide an indication (e.g. to lower layers) to initiate such a procedure, e.g., based on one or more HO procedures; (ii) start a timer and wait for an NW command to switch to another UL (e.g. SUL) on an SN (e.g. a WTRU may suspend SCG transmissions, for example, following expiration of a timer without receipt of a command from an NW); (iii) initiate an action that generated a triggering condition (e.g. perform random access or retry transmission in RLC) on another UL (e.g. SUL) of the SN, and possibly if the other UL is currently configured (for example, if RLF due to RACH problems occurs on the RUL, the WTRU may retry RACH on the SUL if (e.g., and only if) the WTRU has been provided with an SUL configuration by RRC); (iv) start a timer during which a WTRU may continue DL reception on a PSCell, but may delay UL transmission on the PSCell until it receives an NW command (e.g. RRC, MAC CE, or L1) to switch the UL to a different carrier (e.g. a WTRU may suspend SCG transmissions, for example, following expiration of a timer without receipt of a command from the NW); and/or (v) provide an indication (e.g. to lower layers) to reset counters that may be associated with an SCG failure (e.g. number of RLC retries, number of PRACH transmission attempts).

The condition for initiating an action may (e.g. further) depend on the UL that is configured during the time of an SCG failure. The WTRU may initiate an action based on one or more conditions, for example, (e.g. only) when the WTRU is configured with an RUL and not an SUL.

A WTRU may (e.g. when configured with a transmission using only an RUL) suspend SCG transmissions/reception for one or more SCG failure cases, such as: (i) integrity check failure; (ii) SRB3 reconfiguration failure, and/or (iii) RLF due to L1 problems. The WTRU may continue DL reception on a PSCell but delay UL transmission on the PSCell until it receives a reconfiguration or switch of the UL (e.g. to the SUL), for example, for one or more of the following: (i) RLF due to a maximum number of RLC retries by an SCG RLC, and/or (ii) RLF due to random access problems on an SCG MAC. The WTRU may (e.g. following a reconfiguration) re-attempt an UL transmission (e.g. PRACH or RLC retransmission) and may reset associated timers/counters (e.g. number of RLC retries, PRACH transmission counter).

Partial failure of an SCG may occur, for example, based on measurements on an RUL/SUL. In an example, which may be used in conjunction with one or more other examples, a WTRU may (e.g. depending on measurements on a PSCell DL) initiate an action (e.g., instead of suspending an SCG). For example, the WTRU may initiate one or more actions upon reaching a condition of an SCG Failure, for example, for one or more of the following: (i) SCG failure due to maximum RLC retries in an SCG; and/or (ii) SCG failure due to random access problems in an SCG MAC. The conditions and actions may be combined in any combination to suspend SCG transmission/reception.

A WTRU may transmit an SCG failure information message on an SUL. For example, the WTRU may transmit an SCG failure information message on an SUL of an SCG (e.g. instead of to an MN). The WTRU may perform a transmission on an SUL of an SCG, for example, (e.g. only) when one or more (e.g. a combination of) conditions may be satisfied. Conditions may include, for example, one or more of the following: (i) the WTRU is configured (e.g. only) with an RUL; (ii) the WTRU is configured with an RUL and an SUL, but is configured to transmit (e.g. only) on an RUL at the time of an SCG failure; (iii) a DL quality of a PSCell is below a threshold or has been below a threshold (e.g. for a time instant or period) prior to an SCG failure; and/or (iv) an SCG has been triggered by one or more (e.g. a set of) cases (e.g. SCG failure due to a maximum number of RLC retries and/or SCG failure due to random access problems in an SCG).

In an (e.g. additional or alternative example that may be used in conjunction with one or more other examples), the WTRU may transmit the SCG failure information as a message in a RACH procedure (e.g. performed on an SUL). The WTRU may be configured (e.g. only) with RACH parameters for an SUL (e.g. from broadcast signaling) and may transmit an SCG failure information message, e.g., as part of an MSG3 of a RACH procedure or RACH-like procedure that may be performed over an SUL.

The WTRU may select an UL (e.g., SUL or RUL) during a re-establishment procedure. For example, the WTRU may during a re-establishment procedure select among multiple (e.g. two) configured ULs on which to initiate a re-establishment procedure based on one or more criteria. The WTRU may select a UL (e.g. an SUL or RUL) on which to initiate a re-establishment based on one or more conditions, for example, when re-establishment is initiated and a selected cell on which to perform re-establishment procedure may have an SUL configured. Conditions may include, for example, one or more of the following: (i) the cell selected during a re-establishment procedure; (ii) WTRU speed; (iii) WTRU battery power; (iv) DL channel quality of a cell; (v) a previous SUL/RUL configuration that is provided to the WTRU by a cell (e.g. whether the WTRU was configured with only one SUL or RUL, configured with both and activated with one or both), for example, when the WTRU was previously connected to that cell; and/or (vi) the cause of the RLF that has caused the WTRU to perform reselection.

The WTRU may use the RUL, for example, when reselection has occurred to a cell that is different than the cell in which the WTRU triggered RLF, and may use an SUL, for example, when reselection occurred to the same cell in which RLF occurred. The WTRU may use RUL, for example, when reselection has occurred to a cell that is different than the cell in which the WTRU triggered RLF, and when that cell may have DL quality above a threshold. Otherwise, the WTRU may use the SUL for re-establishment to the selected cell.

The WTRU may use a DL quality compared to a threshold to determine whether RUL/SUL may be used for re-establishment, for example, when the selected cell is different from the cell in which the RLF was triggered. When the same cell is selected, the WTRU may use the SUL, for example, (e.g. only) when an RLF may have occurred while the WTRU was on the RUL.

In an (e.g. additional or alternative) example, a condition for selection of RUL/SUL when the same cell is selected may, for example, (e.g. further) depend on a cause of an RLF while the WTRU was connected to the cell. For example, the WTRU may use the SUL when (e.g. only when) the WTRU is configured with RUL while connected to the cell, and/or the RLF occurred as a result of one or more of a subset of RLF triggering conditions (e.g. MAX RLC retries expired or random access problems in the MCG MAC entity).

The WTRU may prioritize cells with an SUL during reselection re-establishment. For example, the WTRU may prioritize cells configured with an SUL during reselection, e.g., for a re-establishment procedure. Prioritization may be made between cells with equal quality. Prioritization may (e.g. also) be made for cells with quality that may differ by a (e.g. certain) maximum range. For example, the WTRU may select a cell with an SUL that is configured, for example, when two cells are measured with equal DL quality during cell reselection. Alternatively or additionally, the WTRU may (e.g. during cell selection) apply a quality offset (e.g. improved quality) for a cell that may have an SUL configured.

The network may provide the WTRU with System Information (SI). The WTRU may perform SI request transmission for an RUL or SUL, for example, when both ULs are available based on system information. The WTRU's decision criteria for selection of an RUL or SUL may depend, for example, on one or more of the following: (i) DL quality of a cell; (ii) WTRU speed; (iii) the WTRU battery power; (iv) type of SI requested; (v) broadcast information for an SI request procedure by a network; (vi) UL (e.g. SUL or RUL) configured to the WTRU at the time of a request; (vii) a cell to which the WTRU is making a request; and/or (viii) a type of SI request procedure (e.g. MSG1 or MSG3 based SI request procedure).

The WTRU may select the UL (RUL/SUL) based on DL quality of a cell. For example, the WTRU may select an SUL for transmission of an SI request, for example, when a DL quality of a cell is below a threshold. The threshold may or may not be the same as the threshold that is associated with selection of a UL for initial access. The WTRU may select a RUL, for example, when a DL quality of a cell is above a threshold.

The WTRU may perform UL selection based on WTRU speed. For example, the WTRU may select an SUL for transmission of an SI request, for example, when WTRU speed is higher than a threshold value. Otherwise, the WTRU may select an RUL.

The WTRU may perform UL selection based on a type of SI requested. For example, the WTRU may select a SUL for transmission of an SI request for one or more SIBs or SI messages. The WTRU may, for example, utilize an SUL for an SI request for high priority SIB (e.g. requiring low latency for acquisition or associated with a high priority service).

The WTRU may perform UL selection based on broadcast information for an SI request procedure by a network. For example, the WTRU may select the SUL for transmission of an SI request based on an SI request configuration (e.g. from an NW). The WTRU may receive (e.g. for an MSG1-based SI request procedure) in broadcast minimum SI, PRACH preamble/resources that may be used to request specific SI messages or SIBs. The WTRU may receive an indication of which UL (e.g. SUL or RUL) resources are applicable to. The WTRU may perform an SI request in a corresponding UL. The WTRU may (e.g. additionally or alternatively) receive a configuration of PRACH preambles/resources for an RUL and an SUL. The WTRU may use another example procedure for selection of a UL for an SI request.

UL selection based UL (e.g. SUL or RUL) may be configured to a WTRU, e.g., at the time of a request. In an example (e.g. for a WTRU in RRC_INACTIVE or RRC_CONNECTED), the WTRU may select a UL for an SI request, e.g., based on a configured or activated UL (e.g. SUL or RUL) for the WTRU. The WTRU may (e.g. in RRC_CONNECTED) may be configured with only an RUL transmission, or may be configured with SUL and RUL with only RUL active. The WTRU may follow configuration/activation (e.g. also) for an SI request while in RRC_INACTIVE. This may (e.g. also) be conditioned to a transmission of an SI request to the same cell which last configured the WTRU. The WTRU may use a configuration to determine a UL to use, for example, when an SI request may be made to the same cell that last configured/activated the SUL/RUL. The WTRU may use a different criteria, for example, when a request may be made to a different cell (e.g. due to mobility during RRC_INACTIVE).

Examples/conditions for the handling of SI may be combined in any combination. For example, the WTRU may use an SUL for transmission of an SI request (e.g. only) for certain SIBs, for example, (e.g. only) when a DL quality of a cell may be below a threshold.

Access control may be implemented for SUL. For example, access control configuration may be specific to a UL carrier. A WTRU may be configured with separate access control configuration for SUL independent of RUL carrier. The WTRU may apply the specific access control configuration associated with the selected UL carrier. Such UL carrier specific access control may enforce independent overload control based on congestion status on the respective UL carrier.

The WTRU may be configured with an access control configuration for a subset of access categories on SUL (e.g., compared to RUL). The WTRU may be configured (e.g., implicitly or explicitly) to prohibit transmissions associated with non-configured access categories on SUL. The WTRU may be configured (e.g., implicitly or explicitly) to reuse the access control configuration from the RUL for the non-configured access categories on the SUL. One or more access control configuration from SUL may override the baseline access control configuration from RUL.

The WTRU may base UL carrier selection on access control configuration (e.g., access control enforcing selective transmission on SUL). For example, a WTRU may be configured to select an uplink carrier from plurality of uplink carriers based on one or more aspects related to access control. The WTRU may (e.g., for based on access control configuration) determine the type of transmissions (e.g. access categories) which are allowed at a specific instant in time in a cell, and/or determine the UL carrier that may be used to perform such transmissions.

In an example, the WTRU may perform UL carrier selection based on access control configuration to route certain UL transmissions to the SUL (e.g., when transmissions over RUL is not desirable or not necessary even though the DL path loss is above a threshold). Examples of situations where routing UL transmissions to SUL may include situations involving congestion in RUL, shorter transmissions, and/or transmissions that trigger a non-WTRU specific response.

In an example involving congestion in RUL, the WTRU may be configured to perform transmission on SUL when the transmissions on RUL are prohibited based on access barring factor configuration and/or when an access barring timer associated with RUL is running and/or transmissions on RUL may be temporarily delayed.

In an example involving shorter transmissions, certain transmissions over SUL may lead to lesser overhead (e.g., the overhead of beamforming on RUL may not be required for short transmissions). The WTRU may be configured for transmissions over SUL for certain access categories (e.g., corresponding to RAN area update in INACTIVE state, etc.). In an example, certain QoS flows that typically produce shorter data bursts may be mapped to the SUL carrier.

In an example involving transmissions that trigger non-WTRU specific response, the WTRU may be configured to perform an on-demand SI request (e.g., dedicated preamble transmission) on the SUL carrier if the DL SI transmission is broadcasted.

The WTRU may be configured with separate access control parameters for SUL and RUL. A selective transmission may be enforced by allowing certain access categories on SUL (and/or blocking those access categories on RUL). For example, the WTRU may be configured with a single access control configuration, wherein the UL carrier to be used for certain access category may be configured as a part of access control parameter itself. For example, each access category may be associated with either SUL or RUL. The WTRU may determine the access category based on the characteristics of transmission (e.g., Qos flow ID or type of control message transmission). The WTRU may determine the applicable UL carrier based on the access control configuration.

The WTRU may implement SUL BWP selection and switching procedures. For example, RRC may configure the WTRU with an association of each DL BWP and/or RUL BWP with one or multiple SUL BWP(s). This may allow the WTRU to maintain similar UL operation characteristics (e.g. BW, numerology, etc.), despite operating on different carriers.

In an example, an association procedure may be determined by the network based on one or more of: WTRU bandwidth operation (e.g., numerology supported by the WTRU); WTRU RF capability (e.g., the ability to support a specific BWP on SUL corresponding to a BWP on RUL); power saving purposes; and/or WTRU service requirements (e.g., required bandwidth, latency, etc.).

A WTRU may receive the required association of SUL BWP and RUL BWP through RRC signaling. The WTRU may utilize such association to allow a switch of BWP for both RUL and SUL using a single command from the network. For example, the WTRU, upon receiving a BWP switch command for RUL/SUL, may perform (e.g., implicitly) a switch of the BWP for the other UL (SUL/RUL) to the BWP defined in the association.

A BWP association between RUL and SUL may be a one-to-one association or a one to many association. For example, in a one to one association, a BWP switch in RUL from BWP1 to BWP2 may automatically result in a BWP switch in SUL to the BWP associated with BWP2. For example, in a one to many association, a switch in RUL to a BWP having multiple associated BWPs in SUL may result in additional rules at the WTRU to select the SUL BWP, for example based on one or more of: DL RSRP/RSRQ; and/or similar aspects related to WTRU bandwidth operation, power savings optimizations, or numerology (e.g., as would be decided by the NW).

A BWP switching command in RUL may depend on the associated paired BWP(s) in the SUL. This may allow the network to initiate a BWP switching in RUL (e.g., only) if the paired BWP in SUL is adapted to WTRU capabilities and requirements.

In an example, when RUL and SUL are both configured to a WTRU, RRC may configure an active BWP in RUL and an active BWP in SUL. Downlink control information (DCI)

based activation/deactivation may be supported. The DCI may be in addition to the activation/deactivation via dedicated RRC signaling. The DCI may contain a one bit information to specify which UL the activation/deactivation command is aimed for.

In an example, when (e.g., only) one UL is configured, (e.g., only) one UL BWP per cell may active at a time. UL carrier switching may be allowed by the WTRU receiving a DCI activation/deactivation BWP command to switch to the BWP of another UL carrier.

In an example, multiple BWPs may be active in the SUL, and the selection or switching of BWPs in SUL may be initiated by the WTRU. The selection or switching of BWPs in SUL may be based on DL measurement of the associated cell.

In an example, if the WTRU is configured with both UL carriers (RUL and SUL) and the DL RSRP received by the WTRU is lower than a threshold, the WTRU may determine it needs to transmit in one of the configured SUL BWPs.

In an example, a WTRU may select one of the SUL BWPs based on the measured RSRQ: (i) for example, if the received RSRP is lower than a threshold, the WTRU may select the SUL associated to the low frequency BWP; and (ii) if the received RSRP is higher than a threshold, but received RSRQ is lower than another threshold, the WTRU may select the higher frequency BWPs.

The WTRU may select the SUL associated to the low frequency BWP since RSRP provides information about signal strength. For example, a low RSRP may be due to path loss attenuation or blockage and BWPs in lower frequency may be more robust to fading and blockage.

The WTRU may select the higher frequency BWPs since, the RSSI value (e.g., beside the RSRP value in the RSRQ calculation) contains interference and noise information. For example, a low RSRQ with a high RSRP may be due to a predominance of interferences, and since higher frequencies are more robust to interferences, the high frequency BWPs may be more suitable to the WTRU.

Systems, methods, and instrumentalities have been disclosed for supplementary uplink (SUL) in wireless systems. Cell suitability criteria may be provided for cells configured with SUL. A WTRU may receive paging with an indication of a carrier (e.g. SUL or regular uplink (RUL)) in which to initiate part or all of an initial access. A Wireless Transmit/Receive Unit (WTRU) that may be performing response-driven paging may provide (e.g. explicit) beam information for beamforming of a paging message on a non-beamformed SUL. A handover (HO) procedure (e.g. carrier selection, configuration handling, HO failure) may be provided for a WTRU with a configured SUL. A WTRU may request a change of a configured UL. A WTRU may (e.g. autonomously) perform a switch to a different (e.g. configured) uplink, e.g., when one or more conditions may be met (e.g. conditional switch). Semi-persistent scheduling (SPS) resources/configuration may be relocated from a first UL to a second UL. Duplication and UL path selection may be provided for radio resource control (RRC) messages in the presence of an SUL. A WTRU may or may not trigger radio link failure (RLF), for example, based on whether RLF related conditions occurred on SUL/RUL and based on SUL/RUL configuration. Conditions may be set for suspension/reset of RLF related counters/timers upon a switch between RUL/SUL. A WTRU may inform a master node (MN) of an RUL/SUL configuration, for example, during secondary cell group (SCG) failure information reporting. A procedure (e.g. with corresponding WTRU behavior) may be implemented for partial SCG failure that may be triggered by SCG RLF on an RUL. A WTRU may select a UL carrier (e.g. SUL/RUL) on which to initiate re-establishment. Procedures may be provided for UL selection of a system information (SI) request in the presence of an SUL/RUL.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

Each of the computing systems described herein may have one or more computer processors having memory that are configured with executable instructions or hardware for accomplishing the functions described herein including determining the parameters described herein and sending and receiving messages between entities (e.g. WTRU and network) to accomplish the described functions.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising a processor, the processor configured to:

receive configuration information for a cell supporting a regular uplink (RUL) carrier and a supplementary uplink (SUL) carrier, the configuration information comprising first semi-persistent schedule (SPS) configuration information associated with the RUL carrier, and second SPS configuration information associated with the SUL carrier;

perform one or more measurements associated with the cell to determine a measurement value;

determine whether to transmit in accordance with the first SPS configuration information associated with the RUL carrier or in accordance and with the second SPS configuration associated with the SUL based on the determined measurement value; and transmit an uplink transmission in accordance with the first SPS configuration information associated with the RUL carrier or in accordance with the second SPS configuration associated with the SUL based on the determination.

2. The WTRU of claim 1, wherein the processor is configured to determine whether to transmit in accordance with the first SPS configuration information associated with the RUL carrier or in accordance with the second SPS configuration associated with the SUL based on whether the determined measurement value is above a configured threshold.

3. The WTRU of claim 2, wherein measurement value corresponds to a reference signal received power (RSRP) measurement value.

4. The WTRU of claim 3, wherein the processor is configured to transmit the uplink transmission in accordance with the first SPS configuration information associated with the RUL carrier if the RSRP measurement value is above the configured threshold.

5. The WTRU of claim 3, wherein the processor is configured to transmit the uplink transmission in accordance with the second SPS configuration information associated with the SUL carrier if the RSRP measurement value is below the configured threshold.

6. The WTRU of claim 1, wherein the configured threshold is indicated in a system information block.

7. The WTRU of claim 1, wherein the one or more measurements are performed on the RUL carrier.

8. The WTRU of claim 1, wherein the one or more measurements are performed on the SUL carrier.

9. A method performed by a wireless transmit/receive unit (WTRU), the method comprising:

receiving configuration information for a cell supporting a regular uplink (RUL) carrier and a supplementary uplink (SUL) carrier, the configuration information comprising first semi-persistent schedule (SPS) configuration information associated with the RUL carrier, and second SPS configuration information associated with the SUL carrier;

performing one or more measurements associated with the cell to determine a measurement value;

determining whether to transmit in accordance with the first SPS configuration information associated with the RUL carrier or in accordance with the second SPS configuration associated with the SUL based on the determined measurement value; and transmitting an uplink transmission in accordance with the first SPS configuration information associated with the RUL carrier or in accordance with the second SPS configuration associated with the SUL based on the determination.

10. The method of claim 9, wherein determining whether to transmit in accordance with the first SPS configuration information associated with the RUL carrier or in accordance with the second SPS configuration associated with the SUL is based on whether the determined measurement value is above a configured threshold.

11. The method of claim 10, wherein measurement value corresponds to a reference signal received power (RSRP) measurement value.

12. The method of claim 10, wherein the configured threshold is indicated in a system information block.

13. The method of claim 11, wherein the WTRU transmits the uplink transmission in accordance with the first SPS configuration information associated with the RUL carrier if the RSRP measurement value is above the configured threshold.

14. The method of claim 11, wherein the WTRU transmits the uplink transmission in accordance with the second SPS configuration information associated with the SUL carrier if the RSRP measurement value is below the configured threshold.

15. The method of claim 9, wherein the one or more measurements are performed on the RUL carrier.

16. The method of claim 9, wherein the one or more measurements are performed on the SUL carrier.

17. A base station comprising a processor configured to:

send configuration information to a wireless transmit/ receive unit (WTRU), the configuration information associated with for a cell supporting a regular uplink (RUL) carrier and a supplementary uplink (SUL) carrier, wherein the configuration information comprise first semi-persistent schedule (SPS) configuration information associated with the RUL carrier and second SPS configuration information associated with the SUL carrier, wherein the first SPS configuration is provided for use by the WTRU if a measurement value is above a configured threshold and the second SPS configuration is provide for use by the WTRU if the measurement value is below the configured threshold; and receive an uplink transmission from the WTRU in accordance with the first SPS configuration information associated with the RUL carrier or in accordance with the second SPS configuration associated with the SUL.

18. The base station of claim 17, wherein the processor is configured transmit a system information block, the system information block indicating the configured threshold.

19. The base station of claim 17, wherein the measurement value corresponds to a reference signal received power (RSRP) threshold.

20. The base station of claim 17, wherein the RUL carrier is associated with a higher frequency range than the SUL carrier.

\*    \*    \*    \*    \*